Figure 1:
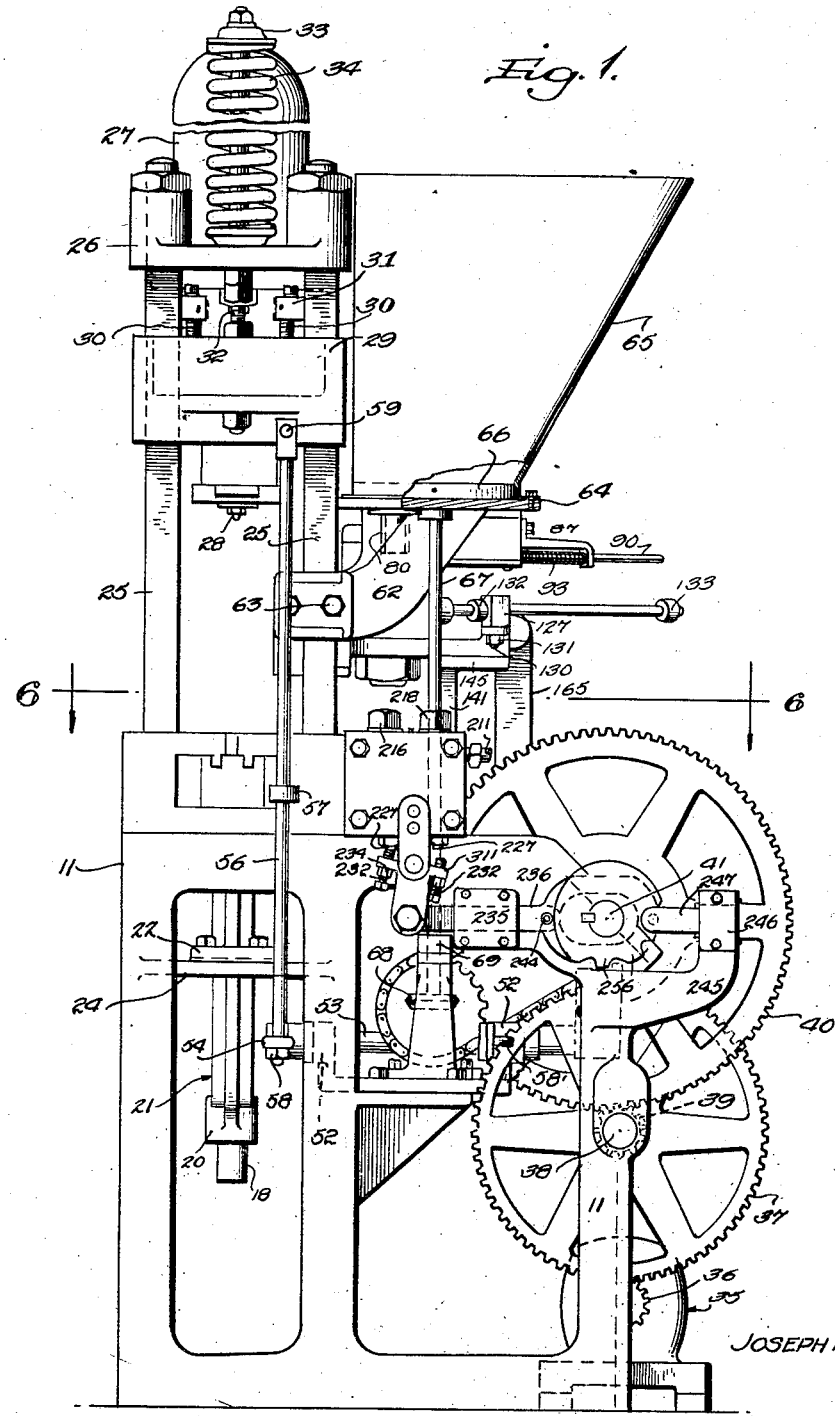

Jan. 7, 1930.  J. F. SCHMIDT  1,742,670

AUTOMATIC PRESS

Filed Nov. 8, 1926  14 Sheets-Sheet 1

Inventor
JOSEPH F. SCHMIDT

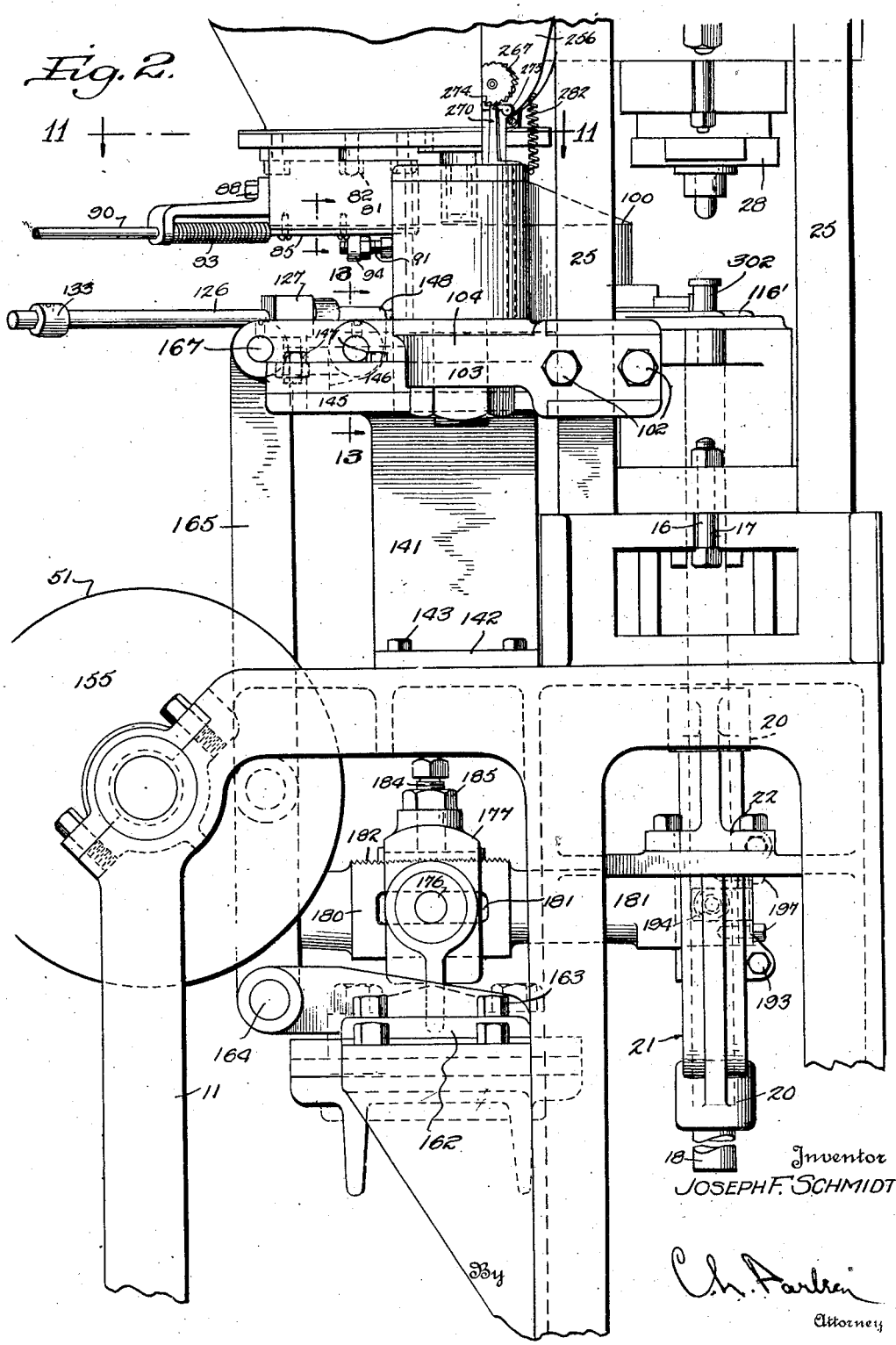

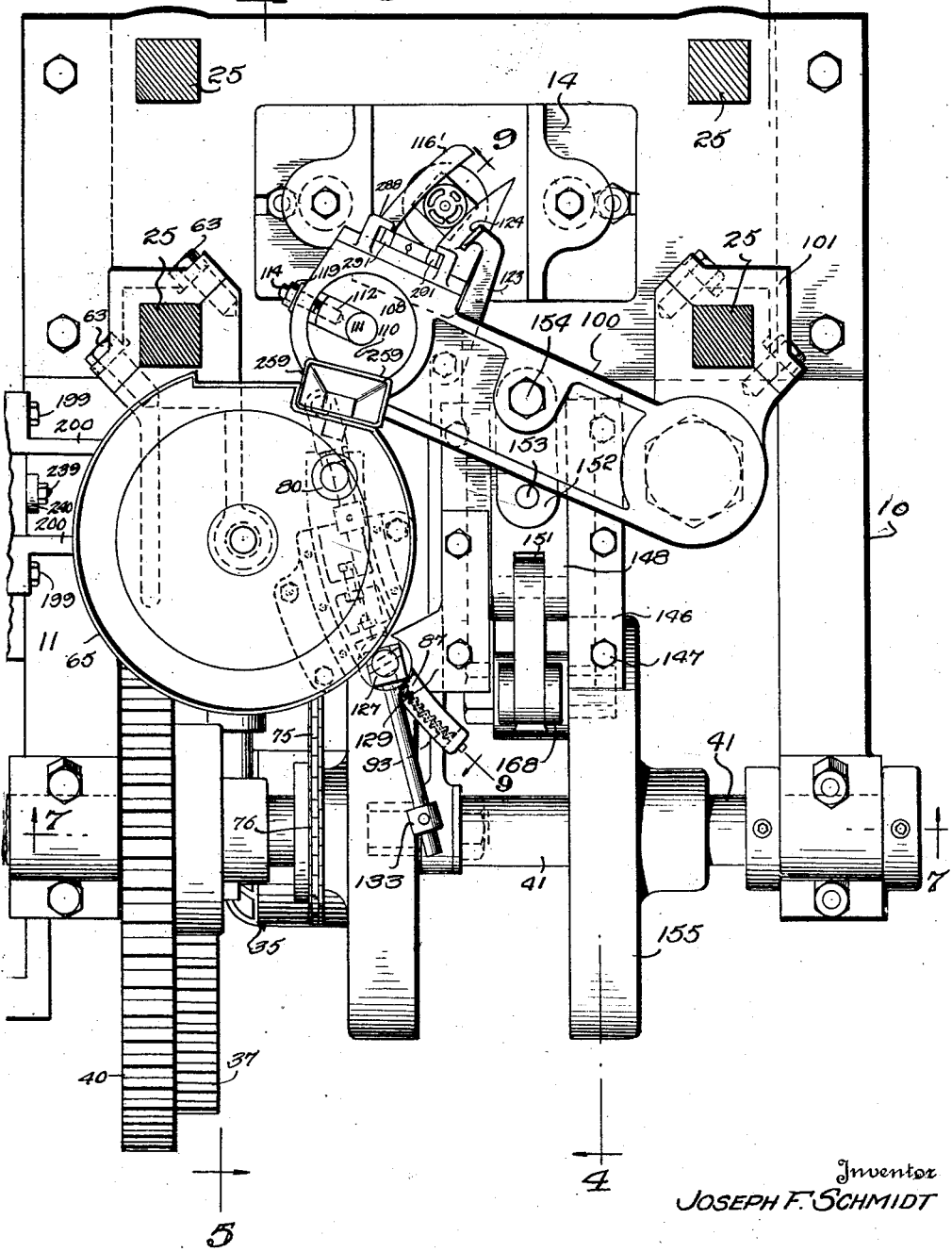

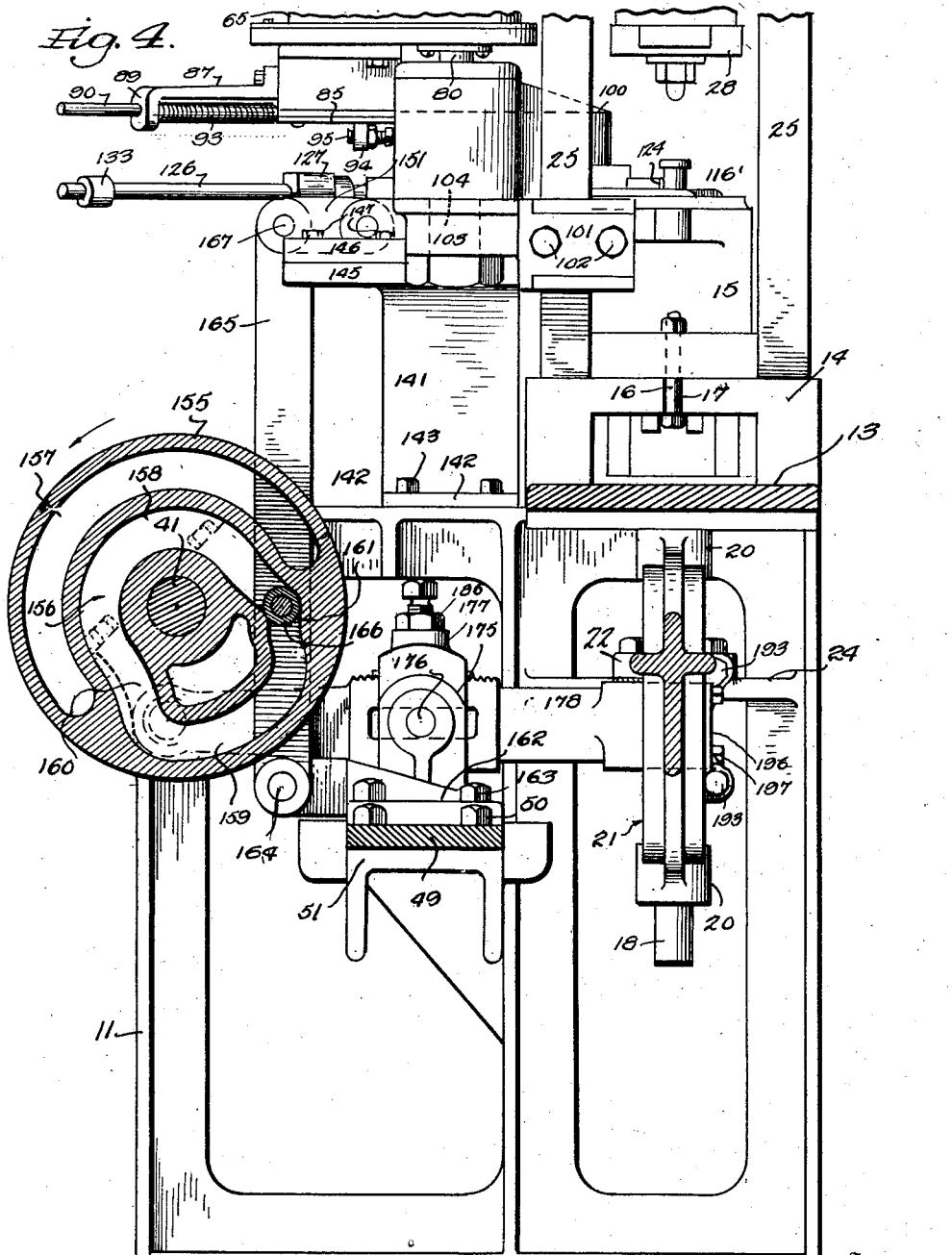

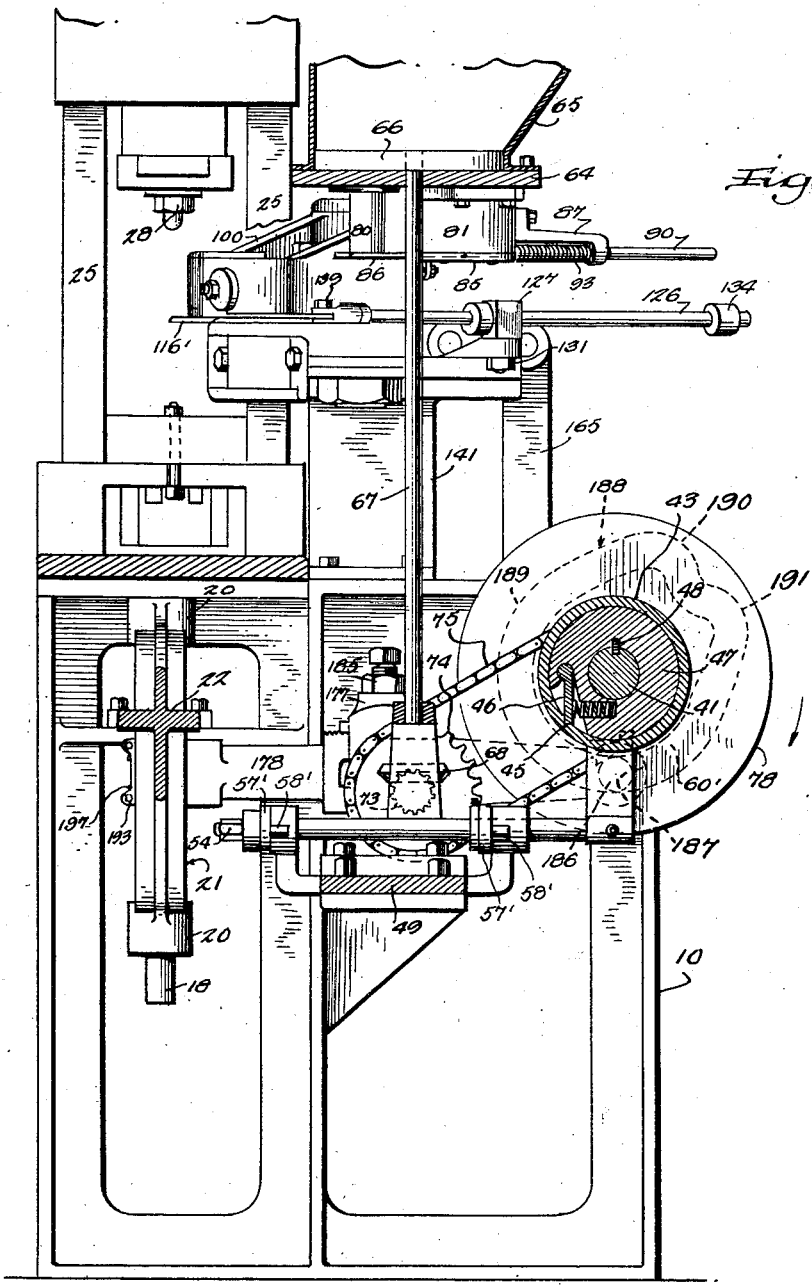

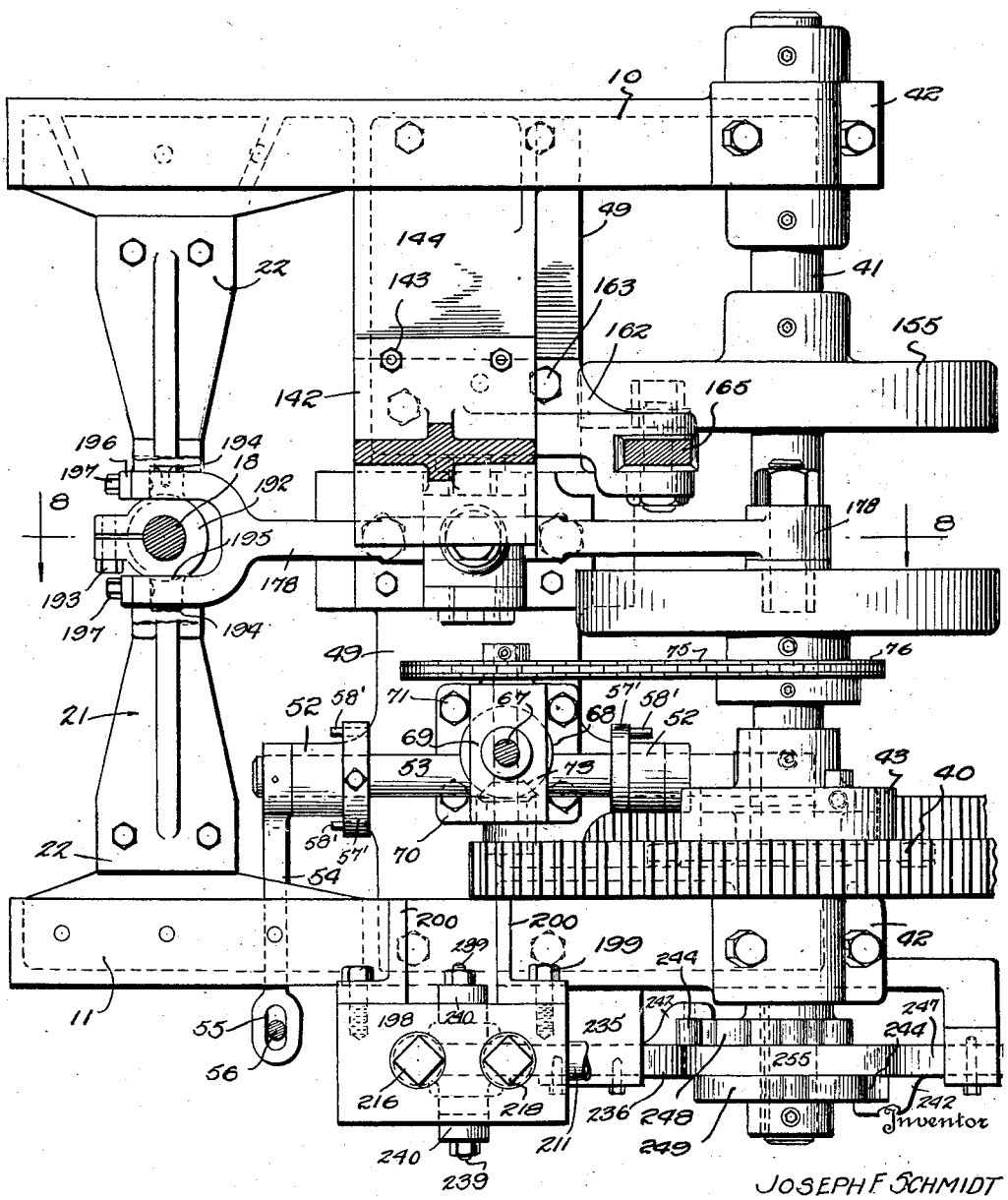

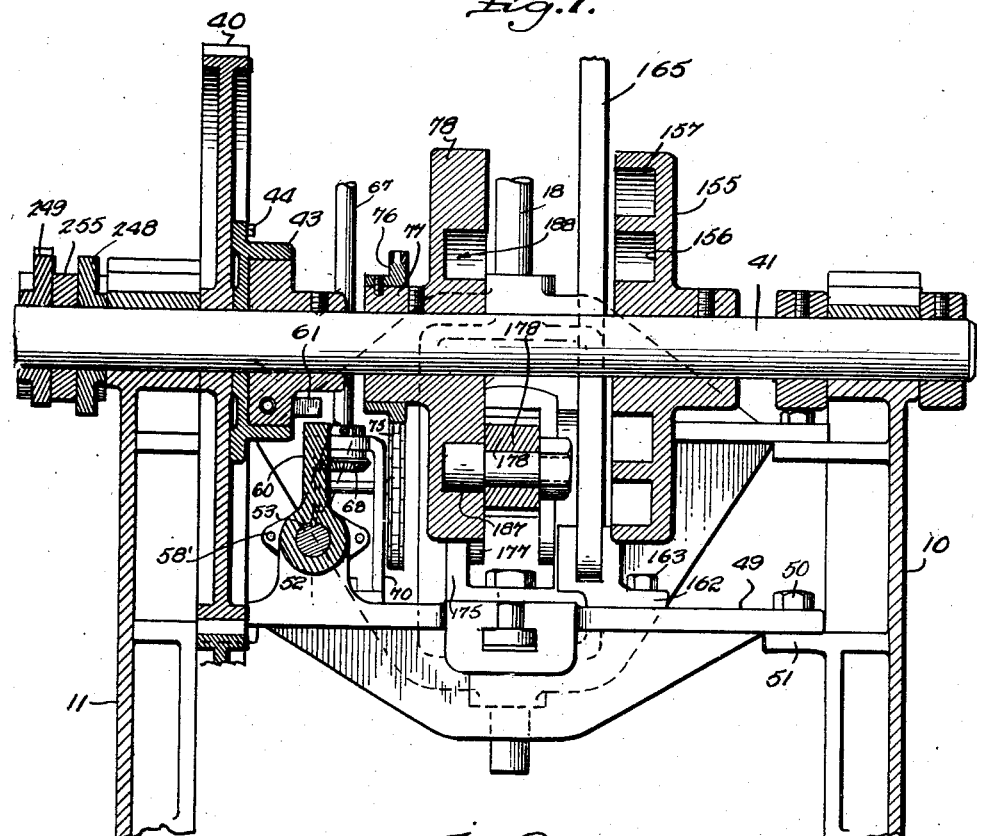
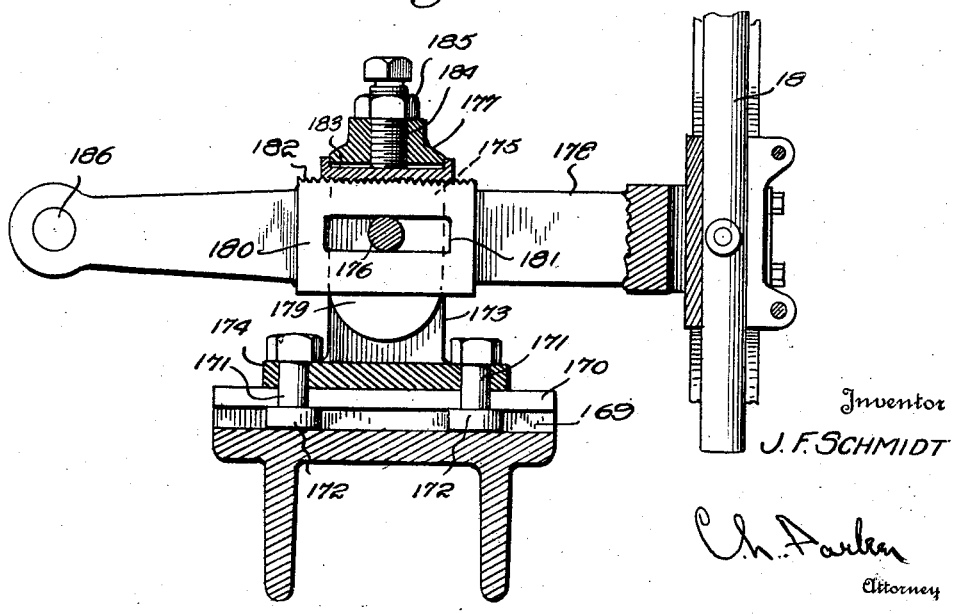

Jan. 7, 1930. J. F. SCHMIDT 1,742,670
AUTOMATIC PRESS
Filed Nov. 8, 1926 14 Sheets-Sheet 8
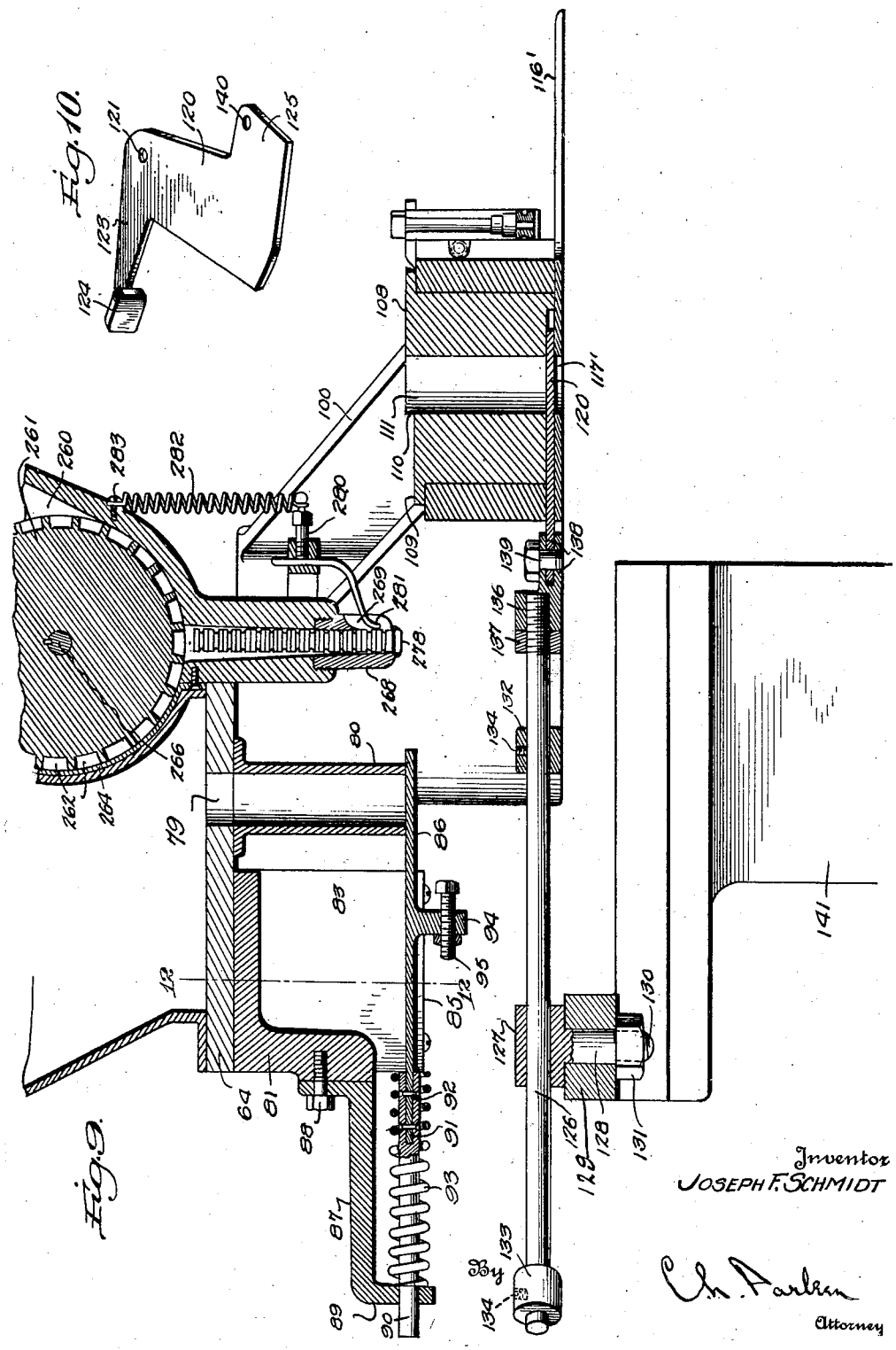
Inventor
JOSEPH F. SCHMIDT
Attorney

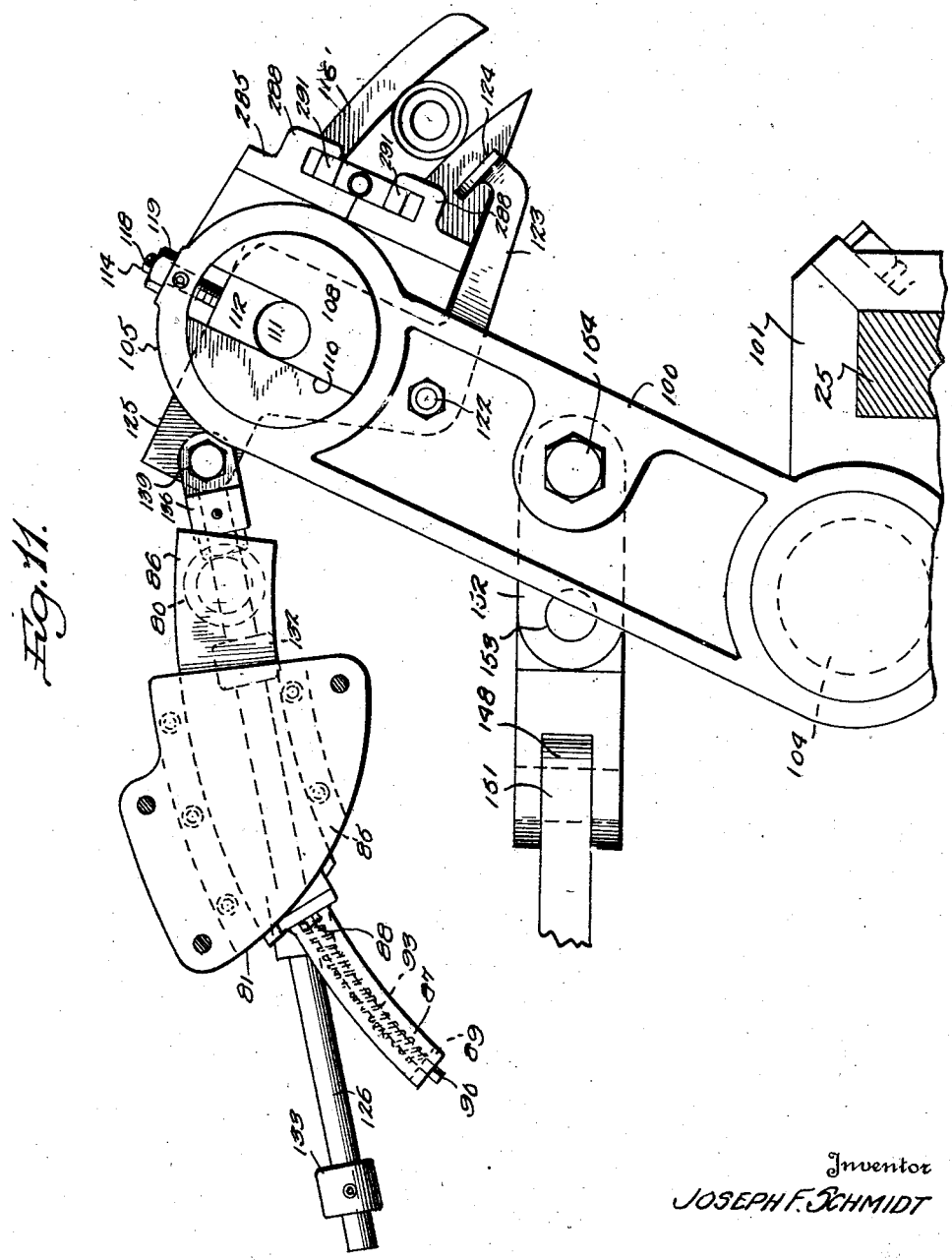

Jan. 7, 1930.  J. F. SCHMIDT  1,742,670
AUTOMATIC PRESS
Filed Nov. 8, 1926  14 Sheets-Sheet 10
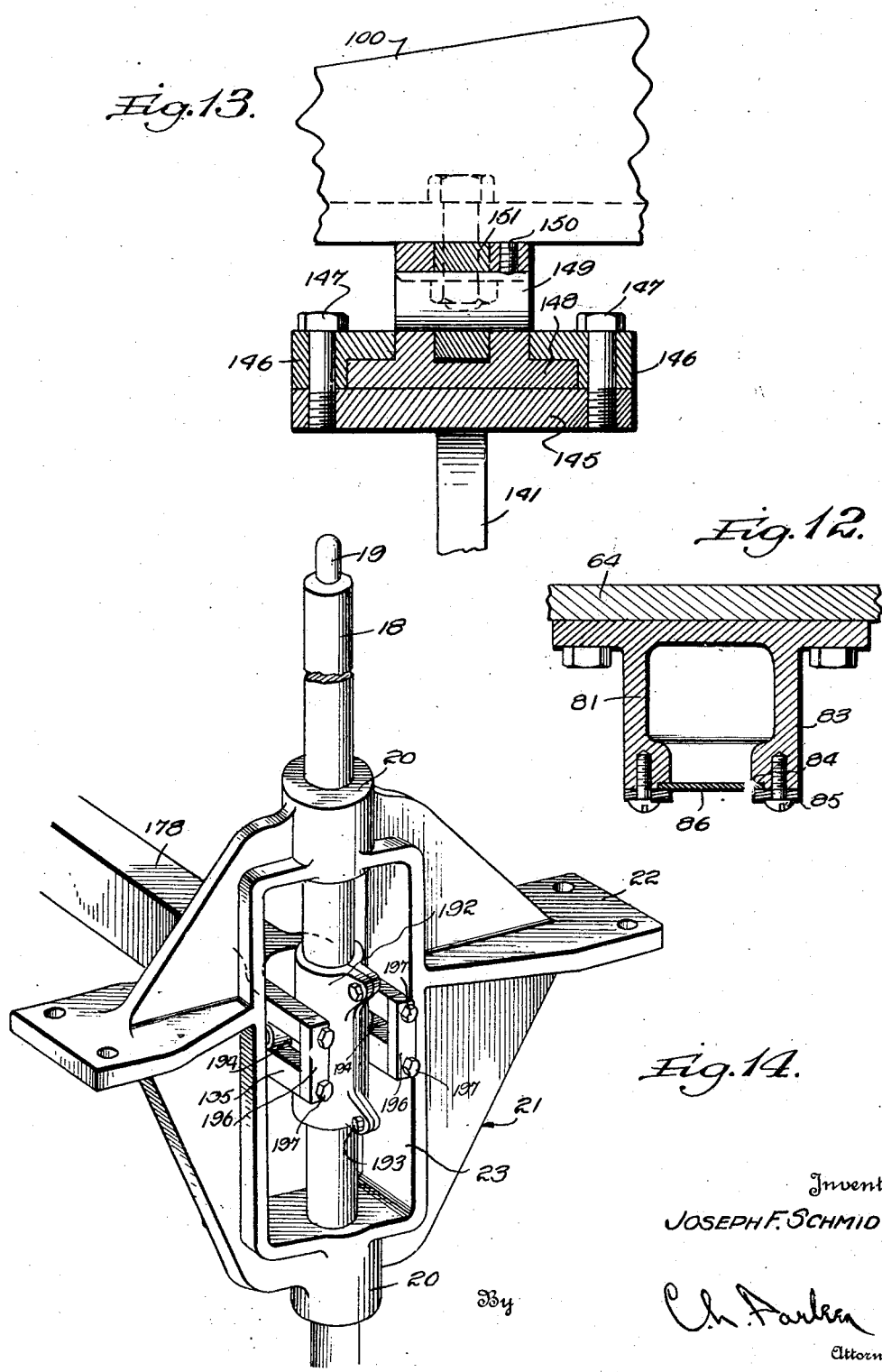
Inventor
JOSEPH F. SCHMIDT Jan. 7, 1930.  J. F. SCHMIDT  1,742,670
AUTOMATIC PRESS
Filed Nov. 8, 1926  14 Sheets-Sheet 11
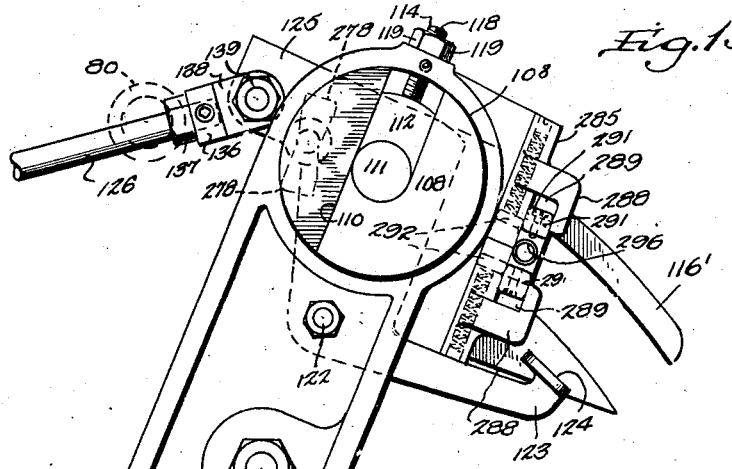
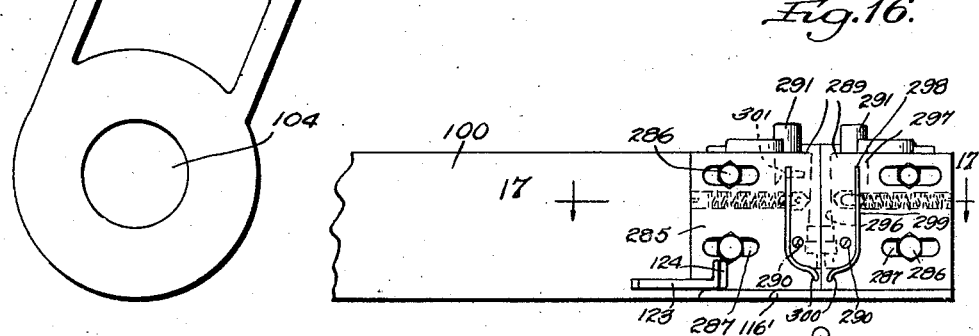
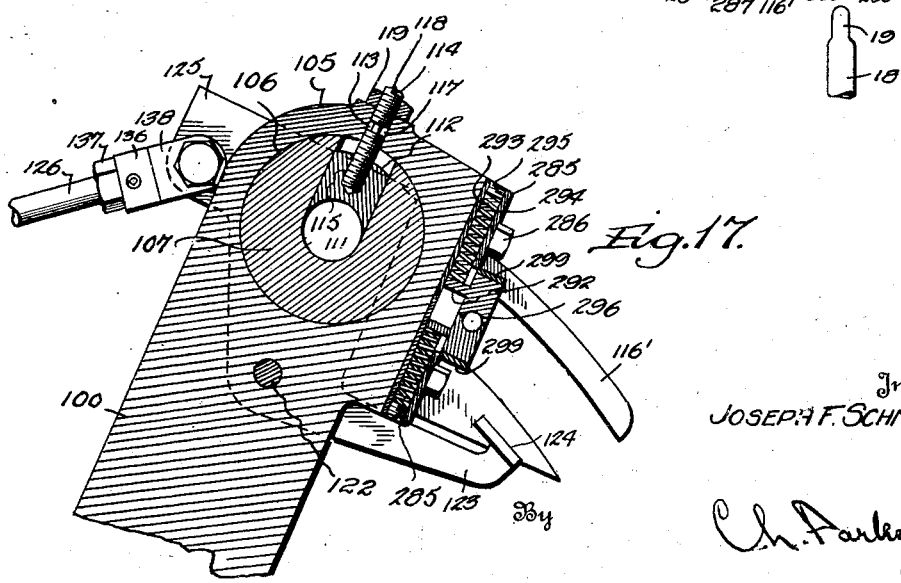
Inventor
JOSEPH F. SCHMIDT
By
Ch. Parken
Attorney

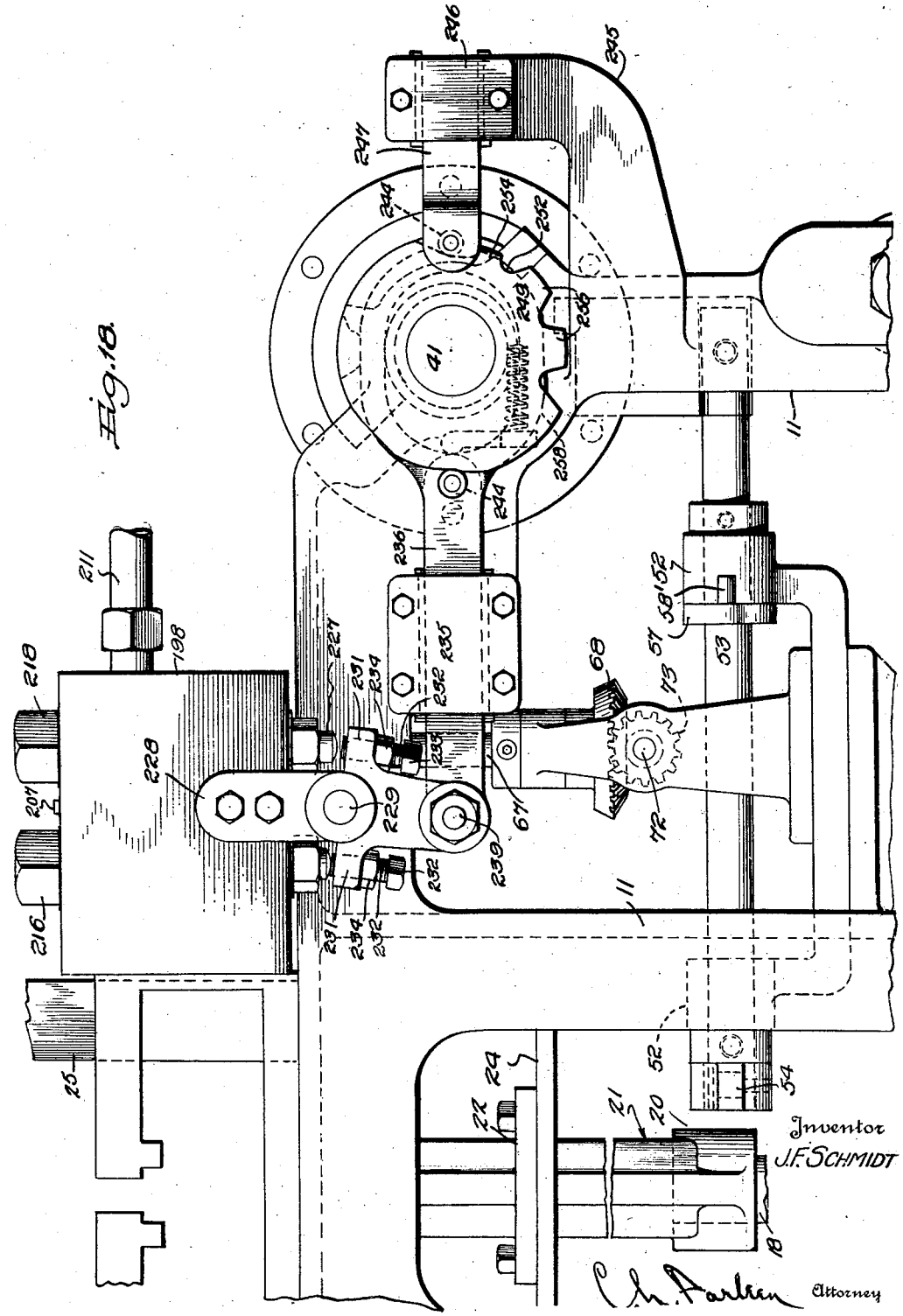

Jan. 7, 1930.  J. F. SCHMIDT  1,742,670
AUTOMATIC PRESS
Filed Nov. 8, 1926  14 Sheets-Sheet 13
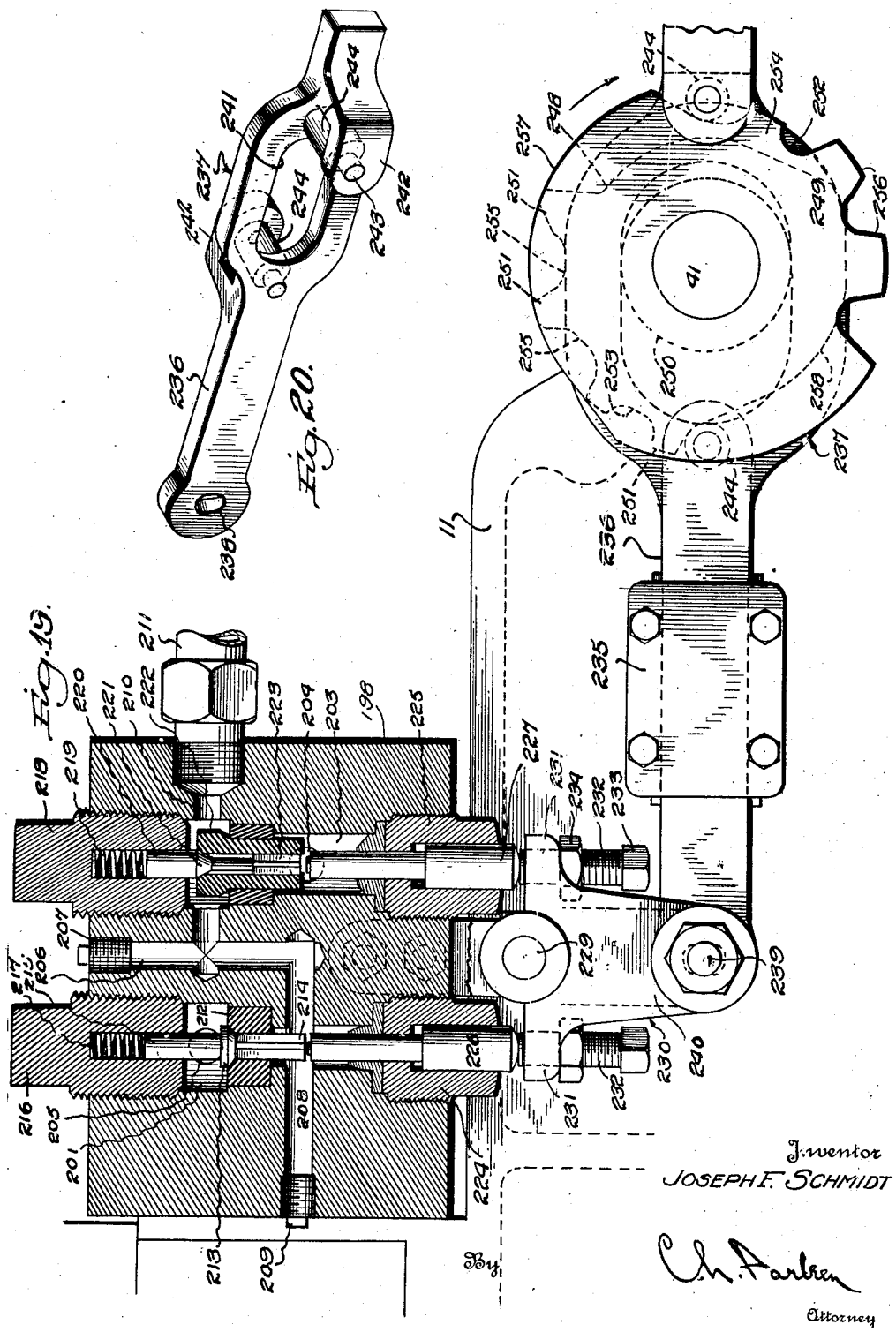
Inventor
JOSEPH F. SCHMIDT
By
Attorney

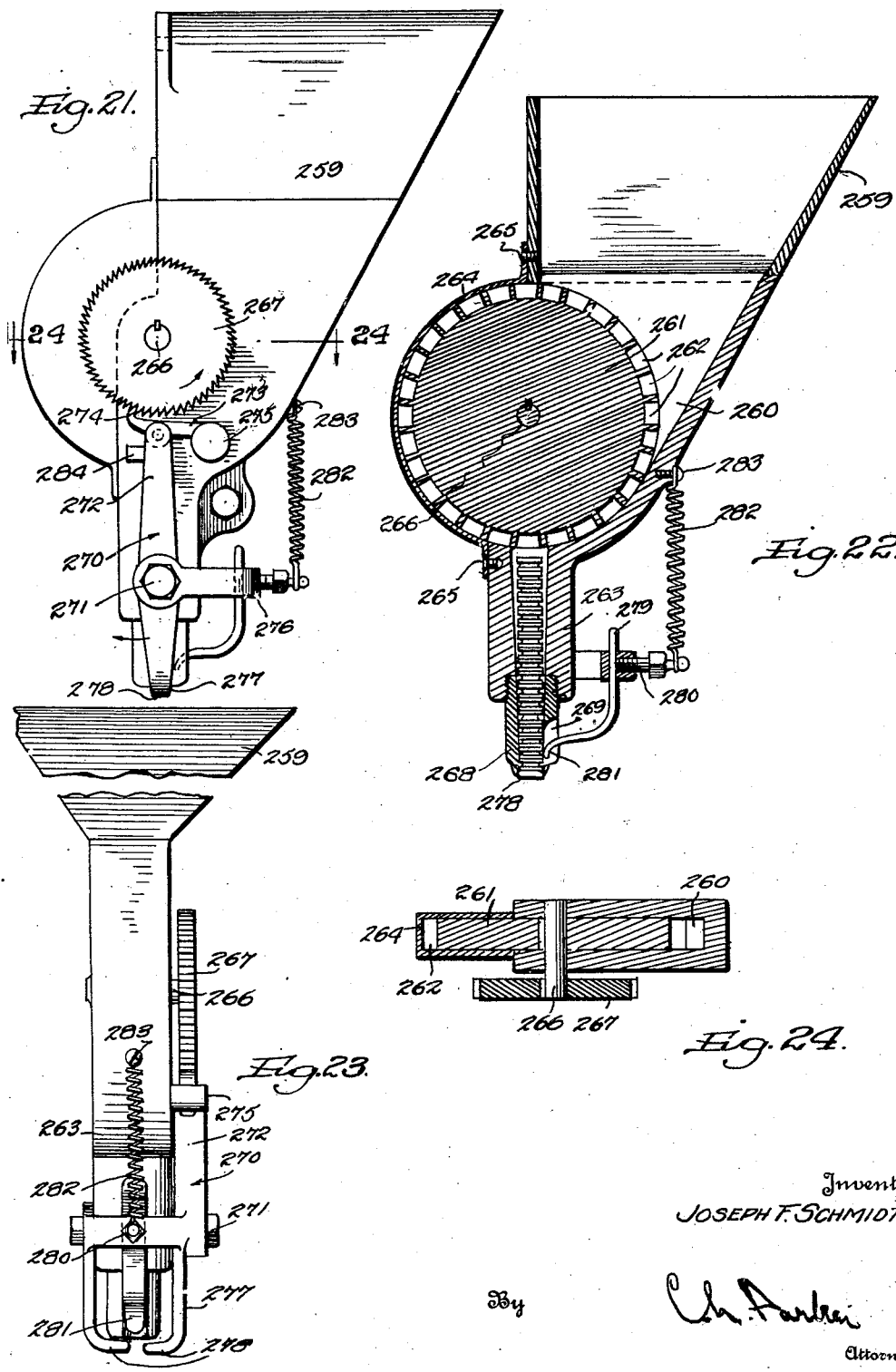

Patented Jan. 7, 1930

1,742,670

UNITED STATES PATENT OFFICE

JOSEPH F. SCHMIDT, OF RAILROAD, PENNSYLVANIA, ASSIGNOR TO WHEELER COMPANY, OF RAILROAD, PENNSYLVANIA, A CORPORATION OF PENNSYLVANIA

AUTOMATIC PRESS

Application filed November 8, 1926. Serial No. 147,116.

This invention relates generally to automatic presses, and more particularly to presses of the hydraulic type, such as those used for forming articles from plastic compositions.

Automatic presses of the type referred to are usually constructed with a base or bed plate in which the lower or stationary mold section is arranged, and an upper reciprocating plunger the lower end of which defines the upper end of the mold. The plunger is provided at its upper end with a piston reciprocable in a pressure cylinder, and hydraulic pressure is employed for forcing the piston and plunger downwardly to compress the material in the mold. The stationary mold section is provided with an ejector which is movable upwardly after the plunger is elevated to lift the finished article from the mold, the article being removed from the apparatus by hand. It is the common practice to individually measure each individual charge for the mold and to place the material in the mold by hand. According to the present practice, as above outlined, two operators are necessary for each molding apparatus, one of the operators manually measuring or weighing each individual charge and pouring the material into the mold after the previously formed article has been ejected therefrom. The second operator controls the operation of the plunger and the ejecting mechanism, and removes the finished article from the ejector after the latter has been elevated to lift the finished article from the mold. Some little skill is required of the second operator in properly causing the plunger to be actuated. The material usually employed is in a loose semi-plastic condition and contains a considerable portion of air. The operator controls a valve which is movable to one position to cause downward movement of the plunger, and to another position to permit the escape of fluid pressure from the cylinder to permit the usual springs to retract the plunger, the valve being adapted to assume a neutral position in which the cylinder is cut off from outside communication, thus preventing the introduction of fluid pressure and the exhausting of the pressure from the cylinder. It is the common practice for the operator to initially admit fluid pressure into the cylinder to cause the downward movement of the plunger, and to immediately move the valve to neutral position, thus holding the plunger in its previously lowered position. This initial operation may be termed the "crowding stroke" and is performed for the purpose of permitting the escape of air from the body of the material in the mold prior to the completion of the compression strokes. After the "crowding stroke" is completed, the control valve for the cylinder is alternately moved to intake and exhaust positions without stopping at the neutral position whereby a series of impacts will be delivered to the material in the mold to properly compress it. The exhaust valve is then opened to permit the coil springs to elevate the plunger, whereupon the second operator depresses a pedal or other lever to lift the finished article from the mold, after which it is removed from the apparatus by hand. The ejector is then withdrawn into the bottom of the mold whereupon the first operator pours into the mold the material which has been measured or weighed during the molding operation.

An important object of the present invention is to provide a molding press of the hydraulic or other mechanically operated type wherein the measuring of the material takes place automatically, and wherein the measuring operation is properly synchronized with the other operations of the apparatus.

A further object is to provide an apparatus of the character referred to wherein the measured material is emptied into the mold and is automatically compressed.

A further object is to provide automatic means for delivering a series of impacts to the material in the mold, such series of impacts including the initial "crowding stroke" previously referred to.

A further object is to provide automatically operated valve means adapted to control the hydraulic cylinder for delivering the series of impacts to the molding composition in the mold.

A further object is to provide automatic means for ejecting finished articles from the mold.

A further object is to provide an ejecting plunger for lifting finished articles from the mold, and to provide means for varying the stroke of the ejector according to the depth of the articles being molded.

A further object is to provide automatic means for removing from the apparatus the finished articles which have been ejected from the mold.

A further object is to provide automatic means for stopping the operation of the apparatus in case of the failure of the molding plunger to return to inoperative position after the completion of the molding impacts.

A further object is to provide means for automatically introducing into the mold metallic articles or the like in the nature of inserts, such as threaded thimbles and the like.

A further object is to provide an automatic press of the character outlined above which is adapted to quickly and efficiently form molded articles of different characters, such as knobs for automobile gear shift levers, switch bases and other articles commonly formed of plastic or similar molding compositions.

Other objects and advantages of the invention will become apparent during the course of the following description.

In the drawings I have shown one embodiment of the invention. In this showing,

Figure 1 is a side elevation,

Figure 2 is an enlarged side elevation of a portion of the apparatus looking at the opposite side thereof, Figure 3 is a plan view, parts being broken away and parts being shown in section, Figure 4 is a vertical sectional view taken on line 4—4 of Figure 3, parts being broken away, Figure 5 is a similar view on line 5—5 of Figure 3, Figure 6 is a horizontal sectional view on line 6—6 of Figure 1, Figure 7 is a vertical sectional view on line 7—7 of Figure 3, Figure 8 is a detail section on line 8—8 of Figure 6, Figure 9 is an enlarged section on line 9—9 of Figure 3, Figure 10 is a detail perspective of one of the material controlling valves, Figure 11 is a horizontal section on line 11—11 of Figure 2, Figure 12 is a section on line 12—12 of Figure 9, Figure 13 is a similar view on line 13—13 of Figure 2, Figure 14 is a detail perspective of the ejector and associated elements, Figure 15 is a plan view of the material feeding arm, Figure 16 is a side elevation of the outer end of the arm, Figure 17 is a detail section on line 17—17 of Figure 16, Figure 18 is a side elevation of a portion of the apparatus showing the valve operating means, parts being omitted, Figure 19 is an enlarged view of the same, parts being shown in section, Figure 20 is a detail perspective of the valve operating yoke, Figure 21 is a side elevation of an insert hopper, Figure 22 is a central vertical sectional view through the same, Figure 23 is an edge elevation of the lower portion of the insert hopper, and, Figure 24 is a detail section on line 24—24 of Figure 21.

Referring to the drawings, the numerals 10 and 11 designate a pair of vertically arranged cast side supporting frames, as shown in Figures 1, 3, 4 and 6. Adjacent the front of the apparatus, the frame sections 10 and 11 are connected by a horizontal bed plate 13 having supporting blocks 14 thereon, as shown in Figures 3 and 4. These blocks are adapted to support a suitable mold 15, the mold being secured to the blocks by bolts 16, the lower ends of which extend through slots 17 to permit lateral adjustment of the mold to properly place it with respect to the mold plunger to be described. It will be apparent that the molds are interchangeable whereby different articles may be formed by the apparatus. The lower end of the mold may be defined by the upper end of an ejecting plunger 18 which may be provided at its upper end with an extension 19 for a purpose to be described. The ejector is mounted to reciprocate in bearings 20 carried by a supporting frame 21 having flanges 22 extending outwardly on opposite sides thereof. The frame 21 is provided with a central vertically elongated opening 23 for a purpose to be described. The frame 21 is bolted or otherwise secured to brackets 24 which may be formed integral with the side frames or carried thereby in any other suitable manner.

Means are provided for compressing material in the lower or stationary mold previously described. In the drawings I have shown a plurality of posts or standards 25 each of which is preferably square in cross section. A support 26 is mounted on the upper ends of the post 25, as shown in Figure 1, and a pressure cylinder 27 is secured to this support. The cylinder is provided with a reciprocating piston (not shown) which is adapted to actuate an upper mold section 28 which is adapted to compress material in the lower mold and to define the shape of the upper end of the molded article. The upper mold section is carried by a crosshead 29 which is slidable on the standards 25, upward movement of the crosshead and associated elements being limited by set screws 30 threaded in lugs 31. The crosshead 29 is provided on opposite sides of the cylinder 27 with a pair of upwardly extending rods 32 which extend through portions of the support 26 and are slidable therein. The rods 32 are provided at their upper ends with caps 33, and heavy coil springs 34 are arranged between the caps 33 and the support 26 to normally urge the crosshead and associated elements upwardly. It is the common practice to admit fluid pressure into the upper end of the cylinder to effect downward movement of the piston and associated elements, these elements being movable upwardly by the springs 34 when the fluid pressure is released from the cylinder. With the exception of certain elements, the portions of the apparatus thus far described form no part of the present invention.

Referring to Figure 1, the numeral 35 designates an electric motor which is adapted to be employed as a source of power for carrying out various mechanical functions to be described. This motor is provided with an armature shaft on which is mounted a pinion 36 meshing with a gear 37. The shaft 38 upon which the gear is rotatably supported, is carried by a portion of the end frame 11, as shown. The gear 37 also carries a pinion 39 meshing with a gear 40 arranged thereabove. The gear 40 is rotatably mounted on a shaft 41 which extends throughout the width of the machine as shown in Figure 6, the shaft being rotatably supported in bearings 42 carried by the frames 10 and 11. As previously stated, the gear 40 is rotatable on the shaft 41 and is adapted to be connected thereto to act as a driving means therefor. Referring to Figures 5, 6 and 7, the numeral 43 designates a clutch drum secured to the gear 40 by bolts or the like 44 whereby the drum is adapted to be driven whenever the motor 35 is operating. The clutch drum is provided in its inner wall with a notch 45 adapted to be engaged by a dog 46 pivotally carried by an inner clutch member 47. The inner clutch member is keyed to the shaft 41 as shown at 48. It will be apparent that rotation of the outer clutch member or collar 43 in a clockwise direction as viewed in Figure 5 is adapted to rotate the shaft 41. The clutch therefore forms means for connecting the source of power to the shaft 41 whereby the latter normally is driven.

Referring to Figures 6 and 7, the numeral 49 designates a shelf or support secured by bolts or the like 50 to extensions 51 preferably formed integral with the frames 10 and 11. The support 49 is provided with integral spaced bearings 52 in which a rock shaft 53 is rotatably mounted as shown in Figures 6 and 7. The forward end of the shaft 53 is provided with a laterally extending arm 54 having a slot 55 in its free end through which extends a substantially vertical rod 56. As shown in Figure 1, this rod is provided with a pair of spaced stops 57 and 58 whereby reciprocation of the rod 56 is adapted to effect a slight rocking movement of the shaft 53. The upper end of the rod 56 is secured as at 59 to the crosshead 29. When the crosshead is lowered, the stop 57 contacts with the arm 54, and when the crosshead is elevated the stop 58 is adapted to lift the arm 54. The shaft 53 is provided with a collar 57' to which are attached pins 58', the latter being adapted to engage one of the bearings 52 to limit the turning movement of the shaft 53. The rear end of the shaft 53 is provided with a clutch control member 60 which is adapted to be arranged in the dotted line position shown in Figure 7 when the arm 54 is elevated by the stop 58, and is adapted to assume the solid line position when the arm is depressed by the stop 57. The dog 46 is provided with an inwardly extending lug 61, as shown in Figure 7, and when the control member 60 is in the solid line position shown in this figure, it has an upwardly projecting portion 60' (see Figure 5) arranged in the path of travel of the lug 61 when the inner clutch member rotates. As will become apparent, the control member 60 normally assumes the dotted line position at the time when the lug 61 reaches its lowermost position, when the apparatus is operating properly, and accordingly the clutch is not affected in any way by the control member.

Referring to Figures 1, 3 and 9, the numeral 62 designates a bracket bolted as at 63 to one of the standards 25. This bracket supports a plate 64 upon which is mounted a hopper 65 adapted to contain the material to be employed in forming the molded articles. The hopper is provided with an agitator 66 which is constantly rotated to keep the material loose within the hopper for a purpose to be described. The agitator is connected to a vertical shaft 67 provided at its lower end with a bevel gear 68. The lower end of the shaft 67 is journalled in a bearing 69 carried by a bracket 70 which is bolted as at 71 against the upper face of the support 49. The arms of the bracket 70 rotatably support a horizontal shaft 72 which carries a bevel gear 73 meshing with the gear 68. Inwardly of the bracket 70 the shaft 72 is provided with a sprocket 74 about which passes a chain 75. The chain also passes about a sprocket 76 carried by the hub 77 of a cam 78, the latter being secured to the shaft 41 to rotate therewith as shown in Figure 7. It will be obvious from the foregoing descriptions that the agitator 66 is adapted to be constantly rotated during the operation of the shaft 41.

Referring to Figures 3, 4, 5 and 9, the numeral 79 designates an opening provided in the plate 64, and through which material in the hopper is adapted to be fed downwardly. A discharge spout 80 is secured against the lower face of the plate 64 in alinement with the opening 79. A guide member 81 is secured against the lower face of the plate 64 by bolts 82 as shown in Figure 2. Referring to Figure 12, it will be noted that the guide member is provided with a pair of depending portions 83 each of which is shouldered as at 84. Plates 85 are secured against the lower ends of the downwardly projecting portions of the guide member and coact with the shoulders 84 to form guide grooves in which a valve or gate 86 is adapted to slide. As shown in Figure 9, the gate 86 has a projecting end which normally closes the lower end of the spout 80 to prevent the feeding of material therefrom. A bracket 87 is secured as at 88 against the rear wall of the guide member 81, and is provided with a depending arm 89 having an opening therein to slidably receive a rod 90. This rod is arranged in alinement with the gate 86 and is bifurcated as at 91 to receive the inner end of the gate, the rod and gate being secured together by rivets or the like 92. A coil spring 93 is arranged between the arm 89 and the adjacent end of the gate to normally maintain the latter in closed position as indicated in Figure 9. If desired, the gate 86 may be provided with a depending lug 94 in which is threaded an adjustable screw 95, for a purpose to be described.

Referring to Figures 2, 3, 10 and 11, the numeral 100 designates a swinging arm which is adapted to operate in a manner to be described to transfer a given amount of material from the spout 80 to the lower mold section. A split bracket 101 surrounds one of the posts 25 and is bolted thereto as indicated at 102. This bracket is provided with a rearward extension 103 through which passes a pivot pin 104 carried by the arm 100. As shown, the arm 100 is provided with a substantially cylindrical portion 105 at its free end, and this cylindrical portion is provided with a vertical opening 106. A substantially cylindrical measuring device 107 is adapted to be received in the opening 106 and is provided at its upper end with a flange 108 which contacts with the upper face of the arm, as shown in Figure 9. One side of the measuring device is provided with a depressed upper face portion 109 forming a shoulder 110. The face portion 109 is arranged in the same plane as the lower face of the gate 86 and is adapted to slide therebeneath when the arm 100 is swung in one direction. Under such conditions, the shoulder 110 engages the end of the gate 86 to slide it to open position to admit material from the spout 80 to the interior of the measuring device.

As stated, the measuring device is substantially cylindrical and is provided with a preferably cylindrical axial opening 111 into which material falls when the gate 86 opens in the manner just described. The measuring device is preferably provided with a movable section 112 shown in detail in Figure 17 of the drawings. This section is movable for the purpose of varying the capacity of the opening 111 in order to measure exactly the right amount of material for each successive article to be molded. Any suitable means may be employed for varying the position of the volume adjusting member 112. As shown the outer end of the arm 100 is provided with an opening 113 in which is rotatably mounted a screw 114. The inner end of this screw is threaded in an opening 115 formed in the member 112. A screw 116 extends through the upper face of the arm and has its lower end arranged in a groove 117 surrounding the screw 114 whereby the latter is adapted to revolve but is prevented from moving inwardly with respect to the cylindrical portion 105 of the arm 100. The screw 114 may be provided with a screw driver slot 118, and is adapted to be maintained in selected position by a lock nut 119.

As shown in Figures 9 and 10, a gate 120 is adapted to close the lower end of the opening 111. This gate is provided with an opening 121 to receive a screw 122 by means of which the gate is pivotally connected to the swinging arm. The gate is provided with an extension 123 having an upturned end 124 which is adapted to remove the finished molded articles from the machine in a manner to be described. The gate 120 is also provided with an inner extension 125 by means of which the gate is adapted to be operated. A forked plate 116' is secured against the lower face of the free end of the arm 100, and the gate 120 slides upon this plate. As shown in Figures 3, 10 and 11 the forks of this plate project a substantial distance beyond the arm 100. The plate 116' is provided with an opening 117' in alinement with the material measuring opening 111. As shown in Figure 9, a rod 126 is slidable in a swiveled guide 127, the latter having a depending shank 128 rotatable in a bracket 129, the mounting of which will be referred to later. The shank 128 is provided with a reduced threaded lower end 130 to receive a nut 131, the latter bearing against the shoulder formed at the upper end of the reduced portion 130. The rod 126 is provided with inner and outer stop members 132 and 133 secured thereto by set screws or the like 134. The inner end of the rod is provided with a connecting member 136 threaded thereon, a lock nut 137 being provided for preventing the rod from becoming loosened from the connecting member. The member 136 is provided with a pair of arms 138 between which is arranged the extension 125, and a screw or other pivot member 139 passes through the arm 138, and through an opening 140 formed in the extension 125. It will be apparent that the swinging of the arm 100 about its pivot 104 causes the rod 126 to slide in the guide 127, thus causing the stops 132 and 133 to alternately contact with the guide 127 to successively open and close the gate 120.

Referring to Figures 2, 6, 9 and 13, the numeral 141 designates a bracket having a base 142 bolted as at 143 to a shelf or support 144 preferably formed integral with the side frame 10. The upper end of the bracket 141 is provided with a horizontal portion 145 the upper face of which is preferably machined. A pair of guides 146 are bolted as at 147 against the upper face of the horizontal portion 145. A slide 148 is mounted in the guides 146 as shown in Figures 2, 3 and 13. The bracket 129 previously referred to (see Figure 9) is arranged over one of the guides 146 to be supported thereby and is secured in position preferably by two of the bolts 147. At its rear end, the guide 148 is provided with a transverse pivot pin 149 secured thereto by a set screw or the like 150. The rear end of the guide 148 is forked to receive the forward end of a link 151 which is pivotally connected to the pin 149. The forward end of the slide 148 is pivotally connected to the forked rear end of a substantially horizontal link 152 by a substantially vertical pivot pin 153. It will be apparent that the link 152 is adapted to swing in a horizontal plane with respect to the slide 148, and the other end of the link 152 is pivotally connected to the swinging arm 100 intermediate the ends thereof as at 154.

Means are provided for oscillating the arm 100. Referring to Figures 3, 6 and 7, the numeral 155 designates a rotatable cam mounted on the shaft 41. The cam 155 is provided with a cam groove 156 and may be cored out as at 157 to lessen the weight of the cam. The cam groove is provided with a substantially concentric inner portion 158 and a concentric outer portion 159 of substantial length. At one end, the inner cam portion 158 is almost directly connected with the outer cam portion as at 160 while at the opposite side of the cam an intermediate relatively short concentric portion 161 is provided for a purpose to be described. As shown in Figures 2, 4 and 6, a bearing bracket 162 is bolted as at 163 against the upper face of the support 49. The outer end of the bracket 162 carries a pivot pin 164 to which is connected an upstanding lever 165. This lever is provided intermediate its ends with a roller 166 arranged in the cam groove 156, whereby the upper end of the lever 165 is adapted to be swung about its pivot 164. The upper end of the lever 165 is pivotally connected as at 167 with the rear end of the link 151, the lever being forked as at 168 to receive the adjacent end of this link.

Means are provided for actuating the ejector 18 to lift finished molded articles from the lower mold section after the upper plunger is elevated. Referring to Figures 7 and 8, the support 49 is provided with a transverse guideway 169, the support being provided with portions 170 overhanging the guideway to form a restricted opening through which the shanks of bolts 171 are adapted to extend. These bolts are provided with lower heads 172 slidable in the guideway 169. A bearing support 173 is arranged over the guideway referred to and is provided with a base 174 through which the bolts 171 extend. The bearing support 173 is provided with a pair of upwardly extending arms 175 in which is mounted a transverse pivot pin 176. This pin extends through a yoke 177 whereby the latter is adapted to swing to a limited extent about the axis of the pin 176. A lever 178 is arranged between the arms 179 of the yoke 177, the central portion of the lever being enlarged to snugly fit between the arms of the yoke. This enlarged central portion of the lever is provided with an elongated slot 181 through which the pin 176 extends. The upper face of the enlargement 180 is roughened or corrugated as at 182 and is adapted to be engaged by a clamping member 183 having a similarly formed lower face. A screw 184 is threaded in the upper end of the yoke 177 and is adapted to be maintained in selected positions by a lock nut 185. It will be apparent that the screw 184 clamps the member 183 downwardly against the lever 178 to prevent movement of the latter transversely with respect to the pivot pin 176.

A bolt 186 is arranged in one end of the lever 178 and carries a roller 187 projecting from one side of the lever. This roller is adapted to operate in a cam groove 188 formed in the rotatable cam 78 previously referred to (see Figure 7). The shape of the cam groove 188 is shown in dotted lines in Figure 5 of the drawings. As shown, the inner portion 189 of the cam groove is arranged concentric with the shaft 41 throughout somewhat more than a half circle, and the cam groove is provided with two high points 190 and 191, the latter being somewhat longer than the former for a purpose to be described.

As previously stated, the bracket 21 is provided with a vertically elongated opening 23, and a clamp 192 surrounds the ejector within this opening, the clamp being secured to the ejector by bolts 193. The clamp is provided on opposite sides with trunnions 194, and these trunnions are slidable within the forked ends 195 formed on the forward end of the lever 178. The slots between the arms 195 are closed by plates 196 secured thereto by bolts 197. As shown in Figures 5 and 7, the rear end of the lever 178 is arranged beneath the shaft 41, and consequently this end of the lever is caused to swing upwardly and downwardly by the cam groove 188 thus raising and lowering the ejector 18.

Means are provided for automatically admitting fluid pressure into the cylinder 27 to accomplish the desired downward movement of the plunger. Referring to Figures 1, 6, 18, 19 and 20, the numeral 198 designates a valve casing secured by bolts 199 to brackets 200 which may be formed integral with the frame 11. As shown in detail in Figure 19, the valve casing is provided with intake and exhaust passages 201 and 203 respectively, the latter being provided with an outlet port 204. The intake passage 201 is provided with an inlet opening 205 connected to a suitable source of fluid pressure supply. The valve body is provided with a vertical preferably drilled opening 206 closed by a plug 207 and this opening communicates at its lower end with a horizontal opening or passage 208 closed at its outer end by a plug 209. Intermediate its ends the opening 206 communicates with a transverse passage 210 which is connected by a pipe 211 with the upper end of the cylinder 27. The pipe 211 is connected to the cylinder in the usual manner and the connection need not be referred to in detail. A valve seat 212 is arranged in the lower end of the intake passage 201 and a valve 213 is adapted to engage this seat to control communication between the intake passage and the transverse passage 208. The valve is provided with a depending guide 214 and an upwardly extending stem 215. A plug 216 is threaded in the upper end of the passage 201 and is provided with a spring 217 to normally seat the valve 213 as will be apparent. The opening forming the exhaust passage 203 extends to the top of the valve casing and is closed by a plug 218. This plug is provided with a spring 219 which normally urges a stem 220 downwardly, this stem carrying a valve 221 at its lower end. The valve is adapted to engage a seat 222 to control communication between the exhaust passage 203 and the transverse opening 210. The valve 221 also is provided with a depending guide 223.

Guides 224 and 225 are arranged in the lower portion of the valve casing as clearly shown in Figure 19. A plunger 226 is arranged in the guide 224 in axial alinement with the valve 213 and the upper end of the plunger is adapted to engage the lower end of the guide 214 in a manner to be described. Similarly a plunger 227 is mounted in the guide 225 in axial alinement with the valve 221, and the latter valve is adapted to be elevated by upward movement of the plunger 227, the upper end of the latter contacting with the lower end of the guide 223.

A pair of depending ears 228 are carried by opposite sides of the valve casing and a pivot pin 229 is supported by these ears. A valve actuating member 230 is mounted to oscillate about the pivot pin 229 as shown in Figures 18 and 19. The actuating member 230 is provided on opposite sides with lateral extensions 231 in which are arranged screws 232. Each of these screws is provided with a lower head 233 and a lock nut 234 whereby it may be secured in selected positions. It will be apparent that the upper ends of the screws 232 are adapted to engage the lower ends of the plungers 226 and 227 to elevate either of the valves 213 or 221. It will be apparent also that under no conditions can the two valves be simultaneously opened.

A guide member 235 is secured against the frame member 11 and slidably receives the shank 236 of a yoke 237. The forward end of the yoke 237 is provided with an opening 238 which is slightly elongated vertically and a bolt 239 passes through this opening and through the depending portion 240 of the valve actuating member. The yoke is provided with an elongated opening 241 for a purpose to be described. At opposite ends of this opening, and at opposite sides of the yoke, a pair of preferably integral arms 242 are provided. Pins 243 pass through each of the arms 242 and the adjacent portion of the yoke and rotatably support rollers 244. The frame member 11 is provided with an integral bracket portion 245 the upper end of which is provided with a guide 246 to receive the extended end 247 of the yoke, as shown in Figure 18.

Outwardly of the frame 11, as shown in Figure 6, a pair of cam members 248 and 249 are arranged on the shaft 41 and spaced from each other. The yoke 237 is arranged in a plane between the cam members 248 and 249, and the opening 241 surrounds a collar 250 mounted on the shaft 41 and carried by the cams. The cam 248 is provided with a series of high points 251 which are adapted to successively engage the inner roller 244 to project the yoke 236 to the left, thus elevating the plunger 226. To correspond with these high points, the cam 249 is provided with a series of low points 252 to permit this action to take place. The cams are adapted to rotate in the direction of the arrow indicated in Figure 19. After the inner roller 244 passes over the first high point 251, of the cam 248, it is adapted to drop into a low point or intermediate depression 253 while the other roller 244 passes over an intermediate high point 254, these portions of the cam being such that the yoke 236 will be moved to an intermediate position with the actuating member 240 in a neutral position whereby neither the intake nor the exhaust valve will be opened. Between the other high points 251, the cam 248 is provided with low points 255 corresponding to similar high points 256 formed on the cam 249. These portions of the cams are such that the yoke 236 will be drawn rearwardly to open the exhaust valve 221. After passing over the series of high and low points referred to, the outer roller 244 passes over a relatively long high portion 257 while the inner roller 244 passes over a similar low portion 258. The relatively long high and low portions obviously hold the yoke toward the right, as viewed in Figure 19, whereby the exhaust valve 221 will be maintained in open position throughout a considerable length of time, during which time the springs 34 will elevate the crosshead 29, and consequently the plunger.

In some forms of articles adapted to be formed with the apparatus of the present invention, it is desirable to provide metal inserts of various kinds, such as electric contacts, threaded thimbles for attaching the articles to other structures, etc., and means are provided for automatically feeding such inserts into the mold prior to placing the molding composition therein.

In Figures 21, 22 and 23 I have shown a hopper 259 which is adapted to be arranged adjacent the material hopper 65, as suggested in Figure 3 of the drawings. It will be apparent that the apparatus is not dependent for its action on the use of inserts in the finished articles, but the placing of these inserts, when desired, can be greatly facilitated by the portions of the apparatus to be described. The hopper 259 is provided with a depending portion 260 in which is rotatably mounted a wheel 261 provided with peripheral pockets 262. Rotation of the wheel 261 is adapted to cause successive inserts to fall into the various pockets 262 as will be apparent. Beneath the wheel receiving portion, the hopper is further provided with a depending substantially tubular extension 263 into which the inserts are adapted to be discharged from the pockets 262. A band 264 is adapted to close the pockets of the wheel outwardly of the hopper, and this band is secured to the hopper and to the tubular extension 263 by screws or the like 265. The wheel 261 is mounted on a shaft 266, and outwardly of the portion 260 of the hopper, a ratchet wheel 267 is secured to the shaft 266. A discharging member 268 is threaded into the lower end of the tubular extension 263 and is provided in one side with an opening 269, for a purpose to be described. An operating member 270 is pivotally connected to the tubular extension 263 as at 271 and is provided with an upwardly extending portion 272 to which is pivotally connected a pawl 273. This pawl is provided at one end with a tooth 274 and at its opposite end with a weight 275 whereby the tooth is normally held in positive engagement with the teeth of the ratchet wheel. The operating member 270 is provided with a yoke 276, and depending arms or stop members 277 are carried by the lower end of the operating member and by the end of the yoke respectively. Each of the members 277 is provided at its lower end with inwardly extending portions 278 which normally prevent inserts within the discharge member 268 from falling therefrom. A spring 279 is secured to the yoke 276 by a screw 280 and the lower end 281 of the spring is extended inwardly into the opening 269 to frictionally engage one of the inserts within the discharge member 268. A spring 282 is connected at its lower end to the screw 280 and at its upper end to the hopper, as indicated at 283. A lug 284 is adapted to limit the swinging movement of the operating member 272.

As shown in Figures 3 and 11, the measuring pocket in the swinging arm 100 swings in a given arc of a circle about the axis of the pivot pin 104 of the swinging arm, and the discharge spout of the hopper and the lower mold section are arranged on this arc of a circle in order that the pocket may collect material from the hopper and transfer it to the mold as the arm swings. The discharge member of the insert feeding device also is arranged on the same arc as indicated in Figures 3 and 15. Means are carried by the swinging arm for collecting one insert as the measuring pocket is filled, and for discharging the insert to permit it properly to be placed in the mold as the arm 100 swings to its discharging position. Referring to Figures 15, 16 and 17, the numeral 285 designates a pair of plates secured against the outer side of the free end of the swinging arm 100. These plates are secured to the arms by screws 286 which pass through slots 287 formed in the plates 285 whereby the plates may be adjusted toward and away from each other for a purpose to be described. Each of the plates is provided with a preferably integral guide 288 as shown in Figures 15 and 16, and the upper ends of arms 289 are arranged within these guides. Each of the arms is pivotally connected as at 290 with one of the plates 285 whereby the upper ends of the arms are adapted to swing toward and away from each other. The upper ends of the arms project beyond the upper limits of the plates 285 as shown at 291. The upwardly projecting ends of the arms are adapted to engage the inwardly projecting portions of the operating member 270 of the insert feeding device in a manner to be described. The arms 289 are provided with inwardly extending lugs 292 which are normally projected inwardly by springs 293 arranged in openings 294 formed in the plates 285, and threaded plugs 295 close the outer ends of the openings 294. Each of the plates 285 is provided in its inner edge with a semi-circular cut out portion 296, these cut out portions coacting to form a circular substantially vertical opening into which the inserts are adapted to fall. This circular opening is somewhat larger at its lower end as shown in dotted lines in Figure 16. Each of the arms 289 is provided at its outer edge with an extended portion 297, and inwardly of this extended portion a groove 298 is provided to receive a spring 299. Each of the springs 299 lies against the outer face of its corresponding arm and curves inwardly therebeneath as shown at 300. The upper ends of the springs 299 are secured to the pivoted arms by screws or the like 301.

The operation of the apparatus is as follows:

Rotation of the clutch drum 43 is accomplished by operation of the motor 35 through the train of gears previously described. As long as the apparatus is functioning properly, the clutch dog 46 will be in engagement with the clutch drum, and consequently the shaft 41 will be constantly driven. Rotation of the shaft 41 constantly drives the cam wheel 155, and the engagement of the roller 166 in the cam groove 156 causes the upper end of the lever 165 to be swung forwardly and rearwardly. The cam wheel rotates in the direction indicated by the arrow in Figure 4 of the drawings, and consequently it will be obvious that as the roller passes from the high portion of the cam it will move directly inwardly to the low portion, thus causing the lever 165 to be swung rearwardly. The upper end of this lever is connected to the swinging arm 100 through the link 151, slot 148, and link 152. When the cam action just described takes place, the free end of the swinging arm will be moved to its extreme rear position, and as this movement takes place, the free end of the arm will contact with the screw 95 and simultaneously, the shoulder 110 formed at the upper end of the material measuring device will contact with the adjacent edge of the gate, thus moving it rearwardly against the tension of the spring 93. The screw 95 is provided to absorb the impact of the swinging arm against the gate 86, thus preventing damage to the latter. When the cam 166 reaches the low portion of the cam groove, the measuring opening 111 will be arranged in axial alinement with the spout 80, and since the gate 86 previously will have been opened, material will be discharged into the measuring opening 111. The movement of the swinging arm to the position described causes the stop 132 to contact with the guide 127, (see Figure 9) thus causing the gate 120 to be positively closed thus preventing the escape of material from the bottom of the measuring device. The low portion of the cam 156 is of substantial length as clearly shown in Figure 4, and since this low portion is concentric to the axis of the shaft 41, it will be apparent that the swinging arm will be maintained in loading position for a considerable period of time, and it is during this time that the formation of an article in the mold takes place, as will become apparent.

As the cam wheel 155 continues to rotate, the roller 166 will travel toward the high point 159 of the cam groove, and during this period it passes through the portion 161 which is concentric with the shaft 41, and consequently the swinging arm will be held stationary for an appreciable length of time, for a purpose to be described. When the roller 166 reaches the high point of the cam, material is adapted to be discharged from the measuring opening into the mold. As previously stated, the lower mold section is arranged on the same arc of a circle as that traversed by the measuring opening, and it will be apparent that the latter is adapted to be positioned directly above the mold to discharge material therein. As the swinging arm approaches discharging position, the stop 133 (see Figures 3 and 9) is adapted to contact with the guide 127 thus arresting movement of the rod 126. Continued swinging of the arm 100 to its forward limit of movement thus causes the rod 126 to exert a pull upon the valve 120 and this valve opens as the measuring opening reaches the proper discharging position in vertical alinement with the mold. Thus it will be apparent that the material in the measuring opening will be discharged, whereupon the molding operation is adapted to take place. Obviously, articles of different shapes and sizes are adapted to be formed on the apparatus, it being apparent that the lower mold proper is removable and replaceable. Obviously, different molded articles require different amounts of the molding composition, and accordingly the measuring device 107 is removable to permit the replacement thereof according to the quantity of material required for given articles. Accuracy of measurement may be secured merely by moving the block 112 radially by means of the screw 114.

As previously stated, the ejector 18 forms a portion of the bottom of the mold, and is upwardly movable to eject finished articles therefrom. During the molding operation, this ejector is held stationary in the bottom of the mold, as will be apparent. After the roller 166 previously referred to, is drawn inwardly toward the low portion of the cam whereby the measuring device is adapted to receive a new charge of material, the molding operation takes place. Referring to Figure 19, it will be noted that the valve actuating member 240 is maintained in an exhausting position throughout a considerable portion of the rotational movement of the cams 248 and 249. It is during this portion of the rotational movement of the cams, that the filling of the mold takes place. After this action is completed, the continued rotation of the cams referred to causes the rollers 244 to be momentarily moved toward the left as viewed in Figure 19, thus elevating the plunger 226 and lowering the plunger 227. This action obviously opens the intake valve 213 and closes the exhaust valve 221. Fluid pressure then flows into the intake passage 201 through port 205, thence downwardly past the valve guide into the passage 208. The pressure fluid then flows upwardly through the lower portion of passage 206, across the valve casing through passages 210, and is thence delivered to the upper end of the cylinder 27 through pipe 211. This introduction of pressure into the upper end of the cylinder causes downward movement of the piston in the cylinder. It will be apparent that the cams 248 and 249 continue their rotation, and immediately after the downward stroke of the piston, as just referred to, one of the rollers 244 drops into the depression 253 while the other roller is forced outwardly by the high point 254. In this position of the rollers, the valve actuating member assumes the position shown in Figure 19, with both the intake and exhaust valves closed, whereby it will be apparent that the piston in the cylinder 27 will be held stationary. The first downward movement of the piston causes the upper mold section 28 to initially compress the material in the mold, immediately after which the upper mold section is held stationary in the manner described, thus permitting the escape of air from the molding composition. The action of the upper mold section and the elements connected therewith, as just described may be termed the "crowding stroke," and this operation usually is accomplished manually by the careful and skillful manual manipulation of the usual valve structures. After the completion of the "crowding stroke," the rollers 244 alternately pass over high and low cam points which alternately open and close the intake and exhaust valves 213 and 221, thus delivering a series of impacting movements to the molding composition, pressure being released by the exhaust valve after each impact to permit slight upward movement of the piston whereby the impact strokes are made effective for highly compressing the material. After the completion of the impact strokes, the article will be completely formed and the rollers 244 pass on to the portions 257 and 258 of the valve operating cams, these portions of the cams swinging the valve actuating member to exhausting position, thus holding the exhaust valve open to permit the escape of fluid pressure from the cylinder, whereupon the springs 34 lift the piston to inoperative position and retract the upper mold section.

It will be appparent that reciprocation of the piston in the cylinder 27 also causes vertical reciprocation of the cross head 29. The vertical rod 56 thus travels with the crosshead during the operations just referred to,
As the crosshead reaches its upper limit of movement, the stop 58 on the vertical rod 56 contacts with the arm 54, thus rocking the shaft 53 and swinging the clutch member 60 to the dotted line position shown in Figure 7. At this point in the operation of the device, the lug 61 carried by the clutch dog 46 passes the clutch control member 60 and is not affected thereby. As the crosshead lowers, the upper stop 57 on the rod 56 positively swings the arm 54 downwardly thus rocking the shaft 53 and swinging the clutch control member to the solid line position shown in Figure 7. In case of such faulty operation of the apparatus as would prevent the upward movement of the crosshead 29, the clutch control member will remain in the solid line position shown in Figure 7, and continued rotation of the clutch dog will cause the lug 61 thereof to contact with the clutch control member thus swinging it inwardly against the tension of its spring and disengaging the inner clutch member 47 from the clutch drum, whereupon the rotation of the shaft 41 will stop. This action obviously stops the operation of the swinging arm 100 and the other elements of the apparatus, thus preventing any damage thereto.

As previously stated, the ejector is adapted to lift finished articles from the mold after the upper mold section has completed the formation of each successive article. The pin 187 carried by the lever 178 engages in the cam groove 188, whereby the forward end of the arm which connects to the ejector is adapted to move vertically. The shape of the cam groove 188 is shown in dotted lines in Figure 5 of the drawings. The cam wheel 78 in which the groove 188 is formed rotates in the direction of the arrow shown in Figure 5. The low portion 189 of the cam groove is concentric with the shaft 41, and is of material length whereby it will be apparent that the ejector remains in the lower portion of the stationary mold a sufficient length of time to permit the completion of the molding operation. As the cam wheel 78 revolves the roller 187 travels outwardly toward the high point 191, thus lowering the rear end of the lever 178 and elevating the forward end of the lever, thus lifting the ejector with the finished article. In Figure 2 of the drawings I have shown one of the finished articles 302 in elevated or ejected position, and the high point 191 is reached upon the approach of the forks of the plate 116', and the high point 191 is sufficiently long to hold the finished article in elevated position until the forks of the plate 116' slide thereunder. The roller 187 then moves inwardly momentarily intermediate the high points 190 and 191, and this action releases the ejector from the finished article. The projection 19 on the upper end of the ejector is adapted to be snugly received within a thimble or similar insert arranged in the finished article, and the downward movement of the ejector while the roller is between the high points 190 and 191 is sufficient to release the projection 19 from the insert in the finished article. The forks of the plate 116' then act as the supporting means for the article, as will be apparent. As previously stated, the cam groove 156 is provided with an intermediate concentric portion 161 whereby it will be apparent that the swinging arm 100 will be held stationary through an appreciable length of time. It is during this stationary position of the swinging arm that the roller 187 reaches the second high point 190, and the intermediate cam groove portion 161 is so designed that the arm will be held in position with the insert receiving opening 296 of the swinging arm 100 in axial alinement with the ejector. While the swinging arm thus remains stationary momentarily, the ejector will be elevated by the high cam point 190 to force the projection 19 upwardly between the free ends of the springs 299. The projection 19 frictionally engages within the opening in the thimble or insert, and after the roller 187 passes the high point 190, the ejector will be moved downwardly carrying the insert into the bottom of the mold on the projection 19. After this downward movement of the ejector, the roller 166 passes beyond the intermediate cam groove portion 161 to place the measuring pocket over the mold, at which time, the valve 120 opens in the manner previously described to discharge material into the mold.

Referring to Figure 10 of the drawings, it will be seen that the valve 120 is provided with an integral upturned portion 124 which obviously moves with the valve when the latter is opened to discharge material. The opening movement of the valve causes the member 124 to swing across the top of the forks of the plate 116, thus pushing the finished article from the forks from whence it drops into a suitable collecting receptacle.

As previously stated, the lower mold section, is removable to permit the use of different molds for forming articles of different sizes and shapes. The different articles obviously vary in height, and accordingly it is necessary to provide means for adjusting the vertical movement of the ejector 18. Referring to Figures 2 and 8, it will be seen that the lever 178 is clamped to the swinging member 177 to oscillate therewith about the axis of the pivot pin 176. When an article of greater height is to be molded, the screw 184 is rotated to release the clamping member 183 from the upper face of the lever, whereupon the slide 173 may be moved forwardly or rearwardly by loosening the nuts of the bolts 171. Obviously this action changes the lever lengths on opposite sides of the pivot pin 176 to adjust the vertical movement of the ejector. When the proper vertical movement is found, the bolts 171 and screws 184 are tightened. Since the movement of the rear end of the lever 178 is constant by virtue of the arrangement of the roller 187 in the cam groove 188, it will be seen that the adjustment of the slide 173 is adapted to provide any desired movement of the ejector 18.

Rotation of the shaft 41 obviously drives the shaft 72 through the chain 75, and rotation of the shaft 72 drives the vertical shaft 67 through gears 73 and 68, thus rotating the agitator 66 and maintaining the material in the hopper in a loose, free flowing condition.

It will be apparent that the insert feeding mechanism may be dispensed with where no metal inserts are to be used in the finished article, but this mechanism has been found highly advantageous when metal ferrules, thimbles or the like are to be used in the articles. From the foregoing description the operation of transferring these inserts from the swinging arm to the mold will be apparent. As previously stated, the discharge member 268 is arranged in the same arc of movement as the insert receiving opening 296 of the swinging arm. As this arm approaches its loading position with the measuring opening 111 approaching a position directly beneath the discharge spout 80, the projections 291 at the upper end of the pivoted arms 289 contact with the inwardly projecting portions 278 of the actuating member 270, thus causing the latter to swing about its pivot 271. Further movement of the swinging arm causes the projections 291 to contact with the discharge member 268, thus causing the upper ends of the arms 289 to swing outwardly. The swinging of the actuating member 270 in the direction of the arrow indicated in Figure 21 causes the lower end of the spring 279 to engage the next to the lowest insert in the discharge member 268, while the lowest insert will be released by the movement of the actuating member, thus permitting this insert to drop into the opening 296 between the arms 289. The springs 299 then engage the insert to prevent it from dropping from the lower ends of the arms 289 until the insert is ready to be engaged by the ejector. After the measuring opening 111 has been filled and the arm 100 starts its reverse movement, the projections 291 will be released from the actuating member 270 whereby the spring 282 returns this member to normal position, releasing the spring 279 from the insert which it previously engaged while the inwardly projecting portions 278 again swing to their normal positions beneath the discharge member 268 to support the inserts therein. The swinging of the actuating member 270 away from normal position causes the tooth 274 to engage the ratchet wheel 267, thus causing rotation of the insert receiving wheel 261 as will be apparent. This rotation of the wheel 261 causes additional inserts to be picked up by the pockets 262, while successive inserts simultaneously will be dropped into the discharge member 268.

For the sake of illustration the invention has been shown and described as applied to presses of the hydraulic type, but it will be obvious that the automatic means for filling the mold, and other features of the invention are equally applicable to other mechanically operated types of presses.

It is to be understood that the form of the invention herewith shown and described is to be taken as a preferred example of the same and that various changes in the shape, size, and arrangement of parts may be resorted to without departing from the spirit of the invention or the scope of the subjoined claims.

I claim:

1. In an apparatus of the character described, a mold having a section movable to compress material in the mold, a source of fluid pressure, means for transmitting pressure from said source to move said mold section downwardly, and automatic means for governing the transmission of pressure to said section whereby a series of successive pressure impulses is transmitted thereto to compress the material in the mold.

2. In an apparatus of the character described, a mold having a section movable to compress material in the mold, a source of fluid pressure, means adapted to transmit pressure from said source to move said mold section downwardly, and automatic valve means controlling said first named means to permit delivery of a series of pressure impulses to said movable mold section to compress material in the mold.

3. In an apparatus of the character described, a mold having a section movable to compress material in the mold, a plunger carrying said movable mold section, a pressure cylinder in which said plunger is operable, a source of fluid pressure, and automatic means for transmitting pressure from said source to said cylinder in a series of intermittent impulses to move said plunger downwardly.

4. In an apparatus of the character described, a mold having a section movable to compress material in the mold, a cylinder, a plunger reciprocable in said cylinder and connected to said movable mold section, a source of hydraulic pressure for said cylinder, and an automatic valve controlling transmission of pressure from said source to said cylinder to deliver to the latter a series of successive pressure impulses to move said plunger downwardly.

5. In an apparatus of the character described, a mold having a section movable to compress material in the mold, a cylinder, a plunger reciprocable in said cylinder and connected to said movable mold section, a source of hydraulic pressure for said cylinder, a valve controlling transmission of pressure to cylinder, and means controlling operation of said valve, said means including a plurality of cams adapted to successively operate said valve to permit transmission of a series of pressure impulses to said cylinder to move said plunger downwardly.

6. In an apparatus of the character described, a mold having a section movable to compress material in the mold, a cylinder, a plunger mounted to reciprocate in said cylinder and connected to said movable mold section, a source of hydraulic pressure, a valve controlling communication between said source and said cylinder, said valve including an operating member, and a rotatable valve operating member including a series of cams adapted to actuate said valve operating member to permit transmission of a series of pressure impulses from said source to said cylinder to move said plunger downwardly.

7. In an apparatus of the character described, a mold including a section movable to compress material in the mold, a source of pressure, and means for transmitting pressure from said source to move said mold section downwardly to compress material in the mold, said means including an inlet valve controlling transmission of pressure to said movable mold section, an exhaust valve adapted to release pressure from said movable mold section, and means for successively opening said inlet valve to permit transmission of a series of pressure impulses from said source to said movable mold section, said last named means being adapted to open said exhaust valve upon completion of said series of pressure impulses.

8. In an apparatus of the character described, a mold including a section movable to compress material in the mold, a source of pressure, means for transmitting pressure from said source to move said mold section downwardly to compress material in the mold, said means including an inlet valve controlling transmission of pressure to said movable mold section, an exhaust valve adapted to release pressure from said movable mold section, and means for successively opening said inlet valve to permit transmission of a series of pressure impulses from said source to said movable mold section, said means being adapted to maintain said exhaust valve closed after the transmission of the first pressure impulse of said series, and to open said exhaust valve after each of the succeeding impulses of said series.

9. In an apparatus of the character described, a mold having a section movable to compress material in the mold, a cylinder, a plunger mounted in said cylinder and connected to said movable mold section, a source of pressure for said cylinder, whereby pressure from said source is adapted to move said mold section to compress material in the mold, an inlet valve controlling transmission of pressure from said source to said cylinder, an exhaust valve operable to release pressure from said cylinder, common actuating means for said valves to permit the opening of said valves singly but not simultaneously, and automatic means controlling said actuating means to open said inlet valve intermittently to transmit a series of successive pressure impulses from said source to said cylinder, said automatic means being adapted to open said exhaust valve through said actuating means after at least two of and after the completion of said series of pressure impulses.

10. A device constructed in accordance with claim 9 wherein said automatic means comprises a cam having a series of high points adapted to open said inlet valve, said cam being provided with a series of intervening low points each of which is adapted to permit said inlet valve to return to closed position, at least one of said low points being adapted to open said exhaust valve through said actuating means.

11. In an apparatus of the character described, a mold having a section movable to compress material in the mold, a cylinder, a plunger mounted in said cylinder and connected to said movable section, a source of pressure for said cylinder whereby said mold section is adapted to be moved to compress material in the mold, an inlet valve controlling transmission of pressure from said source to said cylinder, an exhaust valve operable to release pressure from said cylinder, a pivoted rocking member having portions on opposite sides of the pivot thereof adapted to open said inlet and said exhaust valves respectively, and automatic means for controlling said rocking member to open said inlet valve intermittently to transmit a series of successive pressure impulses from said source to said cylinder, said automatic means being adapted to open said exhaust valve through said rocking member after the completion of said series of pressure impulses and at least once between two of such impulses before the last impulse.

12. In an apparatus of the character described, a mold having a section movable to compress material in the mold, a cylinder, a plunger mounted in said cylinder and connected to said movable mold section, a source of pressure for said cylinder, a valve casing having inlet and exhaust passages, a source of pressure connected to said inlet passage, an inlet valve and an outlet valve adapted to be opened to afford communication between said cylinder and said inlet and exhaust passages respectively, a pivoted rocking member mounted adjacent said valve casing and having portions on opposite sides of the pivot thereof adapted to open said inlet and said exhaust valves respectively, and automatic means for controlling said rocking member to open said inlet valve intermittently to transmit a series of successive pressure impulses from said source to said cylinder, said automatic means being adapted to open said exhaust valve through said rocking member after certain of said impulses and after the completion of said series of pressure impulses.

13. In an apparatus of the character described, a mold having a section inwardly movable to compress material in the mold, said section being movable outwardly with respect to the mold to a point relatively remote therefrom, a hopper, a valve controlling passage of material from said hopper, a movable member having a measuring pocket associated therewith and movable into proximity to said hopper, said movable member being adapted to contact with and to open the valve of said hopper as said measuring pocket approaches a position thereunder to permit a given quantity of material to flow from the hopper to said pocket, spring means adapted to close said valve when said movable member moves away from said hopper, a valve controlling passage of material from said measuring pocket, said movable member being adapted to move to a position with said pocket arranged over said mold when said movable section is remote therefrom, and means controlled by movement of said movable member for discharging material from said pocket to said mold when said pocket is arranged over said mold.

14. An apparatus constructed in accordance with claim 13, provided with a common power source adapted to operate said movable mold section and said movable member.

15. A device constructed in accordance with claim 13 wherein said mold is provided with a movable portion adapted to act as an ejector to lift finished articles from said mold, said movable member being adapted to remove ejected finished articles from proximity to said mold as said movable member approaches said mold.

16. A device constructed in accordance with claim 13 wherein said mold is provided with a movable portion adapted to act as an ejector to lift finished articles from said mold, said movable member being adapted to remove ejected finished articles from proximity to said mold as said movable member approaches said mold, and common actuating means for said ejector mold section, said movable mold section and said movable member.

17. In an apparatus of the character described, a source of power, a shaft adapted to be driven by said source of power, a cam wheel carried by said shaft, a mold having a section movable to compress material in the mold and having another section adapted to act as an ejector for lifting finished articles from the mold, a lever pivotally supported intermediate its ends and connected at one end to said ejector, the opposite end of said lever having a portion engaging said cam wheel to be actuated thereby, a cylinder, a plunger mounted in said cylinder and connected to said movable mold section, a source of pressure, an inlet valve adapted to admit pressure from said source to said cylinder to effect movement of said plunger and said movable mold section, an exhaust valve adapted to exhaust pressure from said cylinder, and rotatable cam means driven by said shaft for operating said valves to successively open said inlet valve to transmit a series of pressure impulses to said plunger, said means being adapted to open said exhaust valve after certain of said impulses and upon completion of said series of pressure impulses.

18. In an apparatus of the character described, a mold having a section movable in one direction to compress material in the mold and movable in the opposite direction to inoperative position to permit emptying and refilling of the mold, a cylinder, a plunger mounted in said cylinder and connected to said movable mold section, spring means normally urging said movable section to inoperative position, a source of hydraulic pressure, a conduit adapted to establish communication between said source and said cylinder to move said movable mold section to compressing position against the tension of said spring means, a valve adapted to control transmission of pressure through said conduit, an exhaust valve adapted to release pressure from said cylinder, a rotatable member having a series of cams adapted to successively open said inlet valve to transmit a series of pressure impulses to said cylinder, said rotatable member being adapted to open said exhaust valve upon completion of said series of pressure impulses, a motor adapted to drive said rotatable member, a hopper having an opening in its lower end, a valve normally closing said opening, a swinging arm having a measuring pocket adapted to be swung into vertical alinement with the opening in said hopper to receive material therefrom, said arm being adapted to swing to a position over said mold to discharge material thereinto, and means connecting said arm to said motor to effect the swinging action thereof in synchronism with the operation of said rotating means whereby said arm is adapted to swing to a discharging position after the completion of said series of pressure impulses and the opening of said exhaust valve and to swing to filling position during said series of pressure impulses.

19. An apparatus constructed in accordance with claim 18 wherein said swinging member is adapted to contact with and open the valve of said hopper as said pocket is moved to a position thereunder, a valve controlling discharge of material from said pocket, and means controlled by movement of said swinging member to open said last named valve as said pocket reaches a position over said mold.

20. An apparatus constructed in accordance with claim 18 wherein said swinging member is adapted to contact with and open the valve of said hopper as said pocket is moved to a position thereunder, a valve controlling discharge of material from said pocket, and means controlled by movement of said swinging member to open said last named valve as said pocket reaches a position over said mold, said mold being provided with a second movable section adapted to lift completed articles from the mold, and means connecting said second movable mold section to said motor to effect said lifting action after said first named movable mold section is withdrawn from the mold, said last named valve having a portion adapted to contact with the lifted finished articles to remove them from proximity to said mold.

21. In an apparatus of the character described, a mold having a movable section adapted to compress material in the mold, spring means normally tending to withdraw said movable mold section to a position remote from said mold, said mold being further provided with a portion adapted to act as an ejector for lifting finished articles therefrom, a source of pressure, means for periodically transmitting pressure from said source to said movable mold section to effect compression of material in said mold, a source of material for said mold, a material feeding member movable from said material source to a position in proximity to said mold to discharge material thereinto, a source of power, a shaft driven from said source of power, means connecting said shaft to said material feeding member to effect operation thereof, and means connecting said shaft to said ejector to lift the latter when said material feeding member is moved away from said mold.

22. In an apparatus of the character described, a mold having a movable section adapted to compress material in the mold, spring means normally tending to withdraw said movable mold section to a position remote from said mold, said mold being further provided with a portion adapted to act as an ejector for lifting finished articles from said mold, a source of pressure, means for periodically transmitting pressure from said source to said movable mold section to effect compression of material in said mold, a source of material for said mold, a material feeding member movable from said material source to a position in proximity to said mold to discharge material thereinto, a source of power, a shaft driven from said source of power, a cam carried by said shaft, means connecting said cam to said material feeding member to effect movement thereof between said source of material and said mold, a second cam carried by said shaft, and connections between said second named cam and said ejector for actuating the latter when said material feeding member is moved away from said mold.

23. In an apparatus of the character described, a mold having a section movable thereinto to compress material therein, a cylinder, a plunger mounted in said cylinder and connected to said movable mold section, spring means normally tending to move said movable mold section to a position remote from said mold, a source of pressure, means for periodically connecting said pressure source to said cylinder to effect movement of said plunger, said mold being further provided with a portion adapted to act as an ejector for lifting finished articles from said mold, a material hopper, a swinging arm pivotally supported adjacent one end and provided in its opposite end with a measuring pocket, said arm being adapted to alternately swing to a position beneath said hopper to receive material therefrom and to a position over said mold to discharge material thereinto, a source of power, a drive shaft, connections between said motor and said drive shaft, a cam carried by said shaft, means adapted to be actuated by said cam for effecting the swinging movement of said arm, a second cam carried by said shaft, and lever means connected to said ejector, said lever means having a portion associated with said second named cam to be actuated thereby, said second named cam being adapted to actuate said ejector when said movable mold section is remote from said mold and when said pocket is in a position beneath said hopper.

24. Apparatus constructed in accordance with claim 23 wherein said hopper is provided with a discharge valve adapted to be opened by movement of said swinging arm to its position beneath said hopper.

25. Apparatus constructed in accordance with claim 23 wherein said hopper is provided with a spout beneath which said pocket is adapted to move to loading position, said spout being provided with a valve adapted to be opened by said swinging arm as the latter approaches loading position.

26. Apparatus constructed in accordance with claim 23 wherein said hopper is provided with a spout beneath which said pocket is adapted to move to loading position, said spout being provided with a valve adapted to be opened by said swinging arm as the latter approaches loading position, a valve carried by said swinging arm and normally closing the lower end of said pocket, and means controlled by the movement of said arm for opening said last named valve as said pocket approaches a position over said mold.

27. Apparatus constructed in accordance with claim 23 wherein said hopper is provided with a spout beneath which said pocket is adapted to move to loading position, said spout being provided with a valve adapted to be opened by said swinging arm as the latter approaches loading position, a valve carried by said swinging arm and normally closing the lower end of said pocket, means controlled by the movement of said arm for opening said last named valve as said pocket approaches a position over said mold, a fork carried by said swinging arm and adapted to slide beneath finished articles after they are lifted by said ejector to support said articles, and a member carried by said second named valve for removing the finished articles from said fork as said second named valve is opened.

28. Apparatus constructed in accordance with claim 23 wherein the connections between said motor and said shaft include a clutch having a dog normally arranged in operative position and movable to an inoperative position, a movable member adapted to be arranged in the path of travel of a portion of said dog, and means controlled by the movement of said movable mold section to a position remote from said mold for moving said member out of the path of travel of said dog.

29. In an apparatus of the character described, a mold having a section movable to compress material therein, means normally tending to move said mold section to a position remote from said mold, automatic means having a portion movable to a position over said mold for discharging material thereinto while said movable mold section is remote from said mold, a source of power, connections between said source and said automatic means for actuating the latter, said connections including a clutch having a dog normally arranged in operative position and movable to an inoperative position, a movable member adapted to be arranged in the path of travel of a portion of said clutch dog, and means controlled by the movement of said movable mold section to remote position for withdrawing said movable member from the path of travel of said clutch dog.

30. In an apparatus of the character described, a mold, means for compressing material in said mold to form finished articles, an ejector adapted to lift finished articles from said mold, a mold loading member having a pocket therein movable to a position over said mold to discharge material thereinto, and means carried by said movable member for holding inserts to be embedded in the finished articles, said ejector having a portion movable to engage an insert carried by said insert holding means and adapted to withdraw the insert into said mold.

31. In an apparatus of the character described, a mold, means for compressing material in said mold to form finished articles, an ejector adapted to lift finished articles from said mold, a mold loading member having a pocket therein movable to a position over said mold to discharge material thereinto, means carried by said movable member for holding inserts to be embedded in the finished articles, said ejector having a portion movable to engage an insert carried by said insert holding means and adapted to withdraw the insert into said mold, insert feeding means, and means for transferring inserts from said feeding means to said holding means.

32. In an apparatus of the character described, an article hopper having a discharging member associated therewith, a movable member adapted to support articles in said discharging member, and an article receiving device adapted to be moved to a receiving position beneath said discharging member to receive articles therefrom, said article supporting member being movable away from supporting position as said receiving member approaches a position beneath said discharging member.

33. In an apparatus of the character described, a mold, means for compressing material in said mold, said mold having a section adapted to act as an ejector for lifting finished articles therefrom, a material hopper, an insert hopper, a swinging arm provided with a pocket for receiving material and a member for receiving inserts, said arm being movable to a loading position with said pocket beneath said material hopper and said insert receiving member beneath said insert hopper, means carried by said arm for supporting articles lifted from said mold by said ejector, said arm being adapted to swing to a discharging position with said pocket arranged over said mold, and means for lifting said ejector as said arm approaches discharging position for frictionally engaging an insert carried by said insert receiving member.

34. In an apparatus of the character described, a mold having a portion adapted to act as an ejector, means for compressing material in said mold, a swinging arm pivotally connected at one end and provided in its opposite end with a pocket for receiving material to be molded, an insert holding device carried by said swinging arm adjacent said pocket, a member carried by said arm for supporting articles ejected from said mold, a drive shaft, a cam carried by said drive shaft and adapted to operate said arm, a second cam carried by said drive shaft and adapted to actuate said ejector, said second named cam having a pair of high points the first of which is adapted to actuate said ejector to lift finished articles from said mold to be supported by said supporting member as the latter reaches a position over said mold, said second named cam having a portion intermediate said high points for momentarily retracting said ejector after the finished article has been engaged by said supporting member, said first named cam having a concentric portion adapted to hold said swinging arm stationary when said insert holding device reaches a position over said mold, the second high point of said second named cam being adapted to actuate said ejector when said swinging arm is in said stationary position to engage an insert in said insert holding device and to withdraw the insert into the mold, said first named cam having a further portion adapted to swing said arm to a position with said pocket arranged over said mold to discharge material thereinto.

35. Apparatus constructed in accordance with claim 34 provided with a hopper, said first named cam being adapted to swing said arm to a loading position with said pocket arranged beneath said hopper, and means actuated by said arm as it approaches loading position for supplying inserts to said insert holding device.

36. An article feeding device comprising a hopper, a discharge spout associated with said hopper, a feeding member adapted to be moved to transfer articles from said hopper to said discharge spout, movable means for supporting articles in said spout, and means connected between said movable means and said feeding member for actuating the latter upon movement of said supporting means.

37. An article feeding device comprising a hopper, a discharge spout arranged beneath said hopper, a rotatable wheel having pockets therein adapted to transfer articles from said hopper to said spout upon movement of said wheel, a pivoted member having portions arranged beneath said spout to support articles therein, said pivoted member being movable in one direction to successively release articles from said spout, connections between said pivoted member and said wheel for actuating the latter upon movement of said pivoted member, and article receiving means adapted to be moved to a position beneath said spout to receive articles therefrom, said receiving member being adapted to contact with said pivoted member to swing it to article releasing position.

In testimony whereof I affix my signature.

JOSEPH F. SCHMIDT.